US011483319B2

(12) United States Patent
Okunlola

(10) Patent No.: US 11,483,319 B2
(45) Date of Patent: Oct. 25, 2022

(54) SECURITY MODEL

(71) Applicant: International Business Machines Corporation, Armonk, NY (US)

(72) Inventor: Olanrewaju Oluwaseun Okunlola, Fredericton (CA)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 16/809,612

(22) Filed: Mar. 5, 2020

(65) Prior Publication Data
US 2021/0281583 A1 Sep. 9, 2021

(51) Int. Cl.
*H04L 9/40* (2022.01)
*G06N 20/00* (2019.01)
*G06N 7/00* (2006.01)

(52) U.S. Cl.
CPC ......... *H04L 63/1416* (2013.01); *G06N 7/005* (2013.01); *G06N 20/00* (2019.01)

(58) Field of Classification Search
CPC ..... H04L 63/1416; G06N 20/00; G06N 7/005
See application file for complete search history.

(56) References Cited

U.S. PATENT DOCUMENTS 6,883,020 B1 * 4/2005 Taranto ............... G06F 16/9574
709/219
6,907,430 B2 6/2005 Chong et al.
(Continued)

FOREIGN PATENT DOCUMENTS

CN 107241352 A 10/2017
CN 109302407 A 2/2019
(Continued)

OTHER PUBLICATIONS

Meeragandhi, G., "Machine Learning Approach for Attack Prediction and Classification using Supervised Learning Algorithms", International Journal of Computer Science & Communication, vol. 1, No. 2, Jul.-Dec. 2010, pp. 247-250.
(Continued)

*Primary Examiner* — Arvin Eskandarnia
(74) *Attorney, Agent, or Firm* — Donald J. O'Brien

(57) ABSTRACT

Embodiments are disclosed for a method for a security model. The method includes identifying a plurality of primary semantic relationships between a plurality of initial incident artifacts for a security domain based on a plurality of historical incidents. The method further includes identifying a plurality of parsed incident artifacts from a security encyclopedia based on the initial incident artifacts. Additionally, the method includes determining a plurality of secondary semantic relationships between the parsed incident artifacts based on a natural language processing of the security encyclopedia. Also, the method includes determining a plurality of influence directions corresponding to the secondary semantic relationships based on the secondary semantic relationships and the historical incidents. Further, the method includes generating an influence network based on the initial incident artifacts, the primary semantic relationships, the historical incidents, the parsed incident artifacts, and the secondary semantic relationships.

20 Claims, 23 Drawing Sheets

(56) References Cited

U.S. PATENT DOCUMENTS

| | | | |
|---|---|---|---|
| 7,844,687 B1* | 11/2010 | Gelvin | H04L 67/12 |
| | | | 709/220 |
| 7,930,256 B2 | 4/2011 | Gonsalves et al. | |
| 8,595,176 B2 | 11/2013 | Wang et al. | |
| 8,843,621 B2 | 9/2014 | DeJana et al. | |
| 8,863,293 B2 | 10/2014 | Christodorescu et al. | |
| 9,292,695 B1 | 3/2016 | Bassett | |
| 9,602,530 B2 | 3/2017 | Ellis et al. | |
| 9,774,616 B2 | 9/2017 | Flores et al. | |
| 9,870,629 B2* | 1/2018 | Cardno | G06Q 30/02 |
| 10,204,140 B2* | 2/2019 | Petride | G06F 16/24553 |
| 2006/0224359 A1* | 10/2006 | Ashcraft | G06F 11/3672 |
| | | | 702/182 |
| 2011/0161381 A1* | 6/2011 | Wang | G06F 16/00 |
| | | | 707/814 |
| 2013/0253808 A1* | 9/2013 | He | G06Q 10/00 |
| | | | 701/117 |
| 2017/0091617 A1 | 3/2017 | Baughman et al. | |
| 2018/0039238 A1* | 2/2018 | Gärtner | G06F 16/2246 |
| 2018/0159745 A1* | 6/2018 | Byers | H04L 41/0896 |
| 2019/0243753 A1* | 8/2019 | Zhang | G06F 11/368 |
| 2020/0372373 A1* | 11/2020 | Tokarev Sela | G06F 16/9035 |

FOREIGN PATENT DOCUMENTS

| | | |
|---|---|---|
| CN | 106341414 B | 4/2019 |
| JP | 6307453 B2 | 4/2018 |

OTHER PUBLICATIONS

Struhl, S., "How Bayesian Networks Are Superior in Understanding Effects of Variables", KDnuggets, printed Nov. 11, 2019, 8 pages, <https://www.kdnuggets.com/2017/11/bayesian-networks-understanding-effects-variables.html>.

Mohammed et al., "The Framework for Information Security Risk Network Management based on Bayesian Belief Decision Support System for Threat on the Campus", Akademik Platform, pp. 37-57.

Mell et al., "The NIST Definition of Cloud Computing", Recommendations of the National Institute of Standards and Technology, Sep. 2011, 7 pages.

* cited by examiner

SECURITY MODEL

BACKGROUND

The present disclosure relates to security events, and more specifically, to identifying security events.

A security model can be a computer learning model that learns to distinguish legitimate computer and/or network activity from the activity of a hacker, or other malicious actor. Thus, security models can be useful for identifying when an attack has occurred.

SUMMARY

Embodiments are disclosed for a method for a security model. The method includes identifying a plurality of initial semantic relationships between a plurality of initial incident artifacts for a security domain based on a plurality of historical incidents. The method further includes identifying a plurality of parsed incident artifacts from a security encyclopedia based on the initial incident artifacts. Additionally, the method includes determining a plurality of secondary semantic relationships between the parsed incident artifacts based on a natural language processing of the security encyclopedia. Also, the method includes determining a plurality of influence directions corresponding to the secondary semantic relationships based on the secondary semantic relationships and the historical incidents. Further, the method includes generating an influence network based on the initial incident artifacts, the initial semantic relationships, the historical incidents, the parsed incident artifacts, and the secondary semantic relationships.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
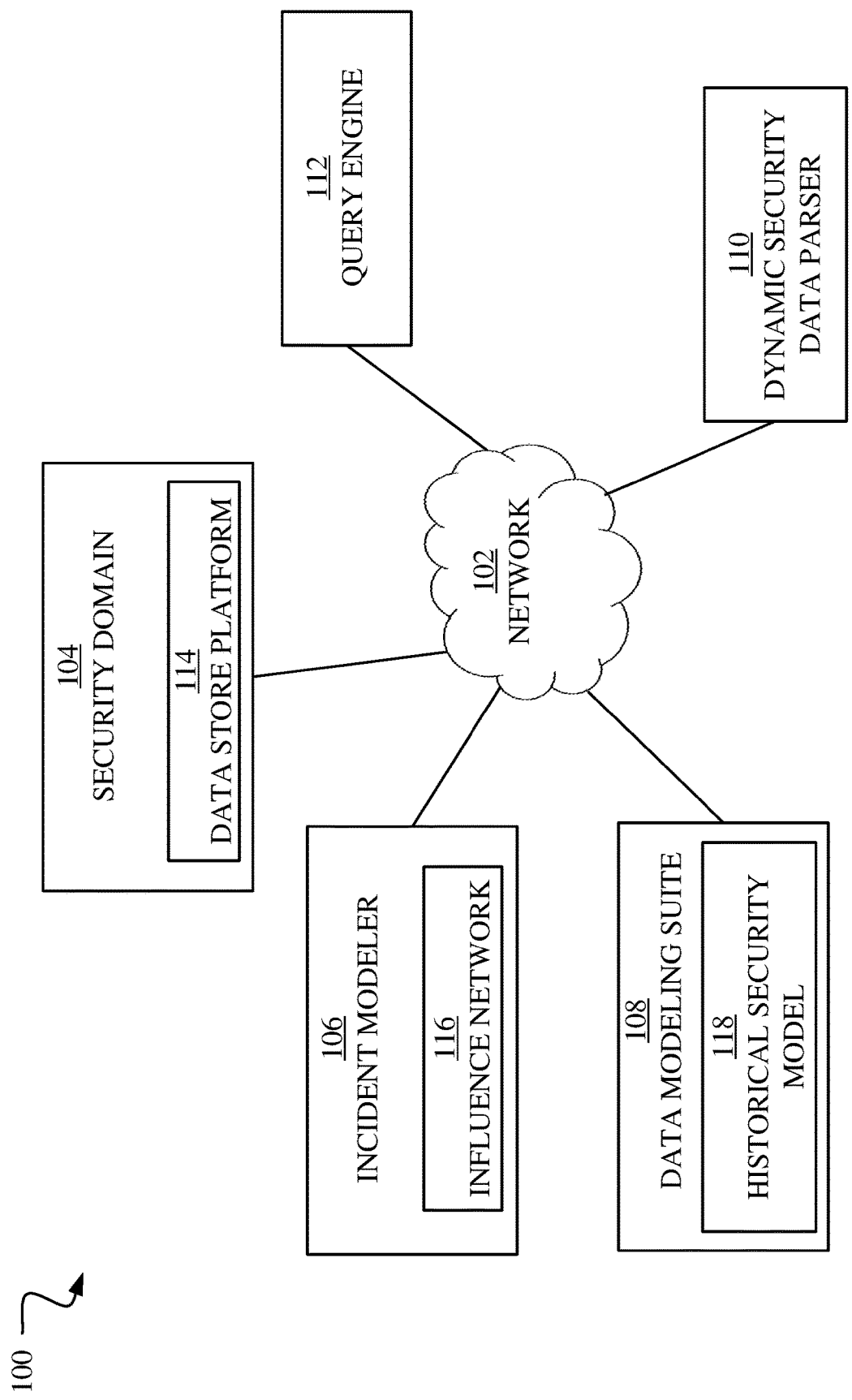
FIG. 1 is a block diagram of an example system for identifying security events, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

The term, security incident, is a technical reference to an attempt to compromise (or an actual compromise of) the security of a computer system. Computer systems can secure data, for example, with encryption. Thus, one example of a security incident can be the attempt to steal and/or actual theft of the respective encryption key. Another example of a security incident is when the malicious actor attempts to and/or takes control of the computer system itself. For example, if a hacker can steal a password that provides access to the root shell, the hacker can illegitimately obtain the highest level(s) of access.

While security incidents can be damaging and costly, it is challenging to protect computer systems (and networks) from such attacks. For example, in the case of known attacks, it can be challenging to determine whether one type of attack is more likely to occur than another. Additionally, it can be challenging to predict where an attack might originate. This can make it additionally challenging to determine how to mitigate even known, recurrent attacks. Further, the challenges in predicting attacks can make security managers reactive instead of proactive. In other words, security managers may be limited to waiting for an incident to occur before being able to take action, e.g., investigating an attack, assessing damage, repairing the damage, and taking prevention measures (when possible).

The term, security information and event management (SIEM), can refer to software tools and/or services that combine the management of security information and security events, i.e., security incidents. In this way, SIEM can analyze alerts that are generated by a computer system and/or computer network (about potential security incidents) in real-time. The SIEM can perform historical analysis of security data, using correlated indicators of security incidents with machine-generated data, e.g., alerts. With a SIEM, security incidents can be investigated on an individual basis. However, with a SIEM, it may be possible to determine if there is a relationship between two elements, e.g., computer applications, of a past security incident given the SIEM's knowledge about those elements.

In this way, some embodiments may use historical data to predict where a future attack may occur. Additionally, with a SIEM, it may be possible to determine how security incident elements are influenced by each other. For example, it may be possible to determine what factors cause one element (such as a username) and another element (such as a computer media access control (MAC)) to frequently occur with a security incident. Also, with a SIEM, it may be possible to determine whether specific security incident elements predict the presence of another security incident element, and/or the presence of a particular attack signature.

Accordingly, some embodiments of the present disclosure can provide a historical security model for a query engine. A query engine, given this model and a set of variables, can use prediction and causality inference techniques, for example, to determine the likelihood of existing and future threats. The historical security model can be generated by the computer learning a security domain's historical security incident data in combination with the natural language processing of literature (e.g., articles, encyclopedias, and/or threat intelligence sources) about computer security. A security domain can represent the hardware and software architecture of a networked computer system, for example. In some embodiments, the historical security model can be generated by creating an influence network that represents the direction (and likelihood) of influence between artifacts in a security domain. From this influence network, some embodiments can generate a Bayesian network, that indicates the likelihood of influences that can indicate an existing or future threat. Influence networks and Bayesian networks are mathematical models used in various sciences, such as statistics, and are described in greater detail below.

FIG. 1 is a block diagram of an example system 100 for identifying security events, in accordance with some embodiments of the present disclosure. The system 100 includes a network 102, a security domain 104, an incident modeler 106, a data modeling suite 108, dynamic security data parser 110, and a query engine 112. The network 102 can be a computer hardware and/or software architecture that provides one or more communication networks, which may include a local area network (LAN) or a wide area network (WAN), for example. In some embodiments, the network 102 can represent the Internet. In some embodiments, the network 102 provides computer communication services between the security domain 104, incident modeler 106, data modeling suite 108, dynamic security data parser 110, and the query engine 112.

The security domain 104 can be a computer hardware and software architecture, such as a server farm, but could include any number of computer nodes and associated hardware and software combinations. In some cases, the security domain 104 (or components thereof) can be air-gapped. Being air-gapped means that the air-gapped component is not connected to the network 102. The security domain 104 can include a data store platform 114. The data store platform 114 can represent a computer hardware and/or software architecture that records auditable data about the security domains 104. Additionally, the data store platform 114 can provide access to this data stored on the data store platform 114. Providing access to the data on the data store platform 114 makes it possible to produce reports and perform analysis on the activities of the security domain 104. The auditable data can include raw events and network data, for example, and can include identifying information about associated artifacts involved in each incident. Raw events and network data can include a myriad of actions that take place on a security domain 104. For example, raw events and network data can range from the installation of firmware on a particular hardware device to the execution of a computer network communication by that firmware. In some embodiments, the data store platform 114 can represent a STEM platform.

The incident modeler 106 can represent a computer hardware and/or software architecture that derives data about the security domain 104 from the data store platform 114 and uses the derived data to generate and/or refine an influence network 116 representing the security domain 104. The influence network 116 is described in greater detail with respect to FIG. 8.

The data modeling suite 108 can represent a computer hardware and/or software architecture that uses the influence network 116 to generate and/or refine a historical security model 118. In some embodiments, the historical security model 118 can be a Bayesian network that represents security-implicated relationships between artifacts of the security domain 104.

A Bayesian network is a probabilistic model represented in a directed graph of nodes (artifacts) and connecting lines (edges) that represent the probability of an association between the two nodes. Such networks are called Bayesian networks because the probabilities are based on Bayesian inference, which is a technique in the scientific field of statistics. Bayesian inference takes new evidence and Bayes' theorem to update the mathematical probability of a hypothesis. Bayesian networks can thus potentially be used to model causation between two artifacts by representing the direction of the influence of two artifacts and the likelihood that the representation of one causes the other.

Bayesian networks can be useful for capturing conditional dependencies between various events and accounting for relatively large sets of variables in a sequence of events. As such, Bayesian networks can produce useful results in determining the effect of a relatively large number of variables on a given outcome. While Bayesian networks can outperform classical regression techniques when determining inference representations, Bayesian networks often perform better with a relatively strong domain knowledge of the area to be modeled. Thus, in some embodiments of the present disclosure, the historical security model 118 can be automatically updated with supervised learning.

However, it can be challenging to determine the exact structure of a complex security domain, in some cases involving the hiring of a domain expert. Additionally, the security landscape changes on a weekly basis, with new threat actors and vectors being found seemingly every day. As such, it is useful to keep the Bayesian network accurate in its formation and yet flexible enough to handle new input gracefully. However, gathering probabilities can become intractable, with challenging performance impacts when dealing with very large Bayesian network graphs. Further, while the linkage in a Bayesian network can indicate correlation, correlation may not indicate causation. Additionally, given the number of potential artifacts in a complex security domain, the variety of variables implicated in a potential security incident, and the mathematical complexity involved, generating a Bayesian network that accommodates these factors can be too large to be of practical use. The time involved in generating such a Bayesian network could potentially span days, weeks, or longer.

Accordingly, the historical security model 118 can be generated from a limited Bayesian network, wherein artifacts are included therein based on the likelihood of being implicated in a security incident. In this way, the size of the Bayesian network can be limited, thus conserving time by not generating parts of the Bayesian network that appear less likely to be implicated in a security incident.

In some embodiments, the dynamic security data parser 110 can analyze historical security incidents from the data store platform 114 and build a historical security model 118 that represents a baseline of the organization's security incident history. The historical security model 118 can be based on the influence network 116 of the security domain 104. Additionally, the dynamic security data parser 110 can analyze all the artifacts implicated in each historical security incident, determine a classification of the historical security incident and the time it occurred. Further, the dynamic security data parser 110 can query literature and other secondary data sources for tangential information related to the historical security incident artifacts. Secondary data sources can include journal articles, security blogs, and other documents relevant to computer security. Using natural language processing and computer learning, the dynamic security data parser 110, incident modeler 106, and data modeling suite 108 can train the historical security model 118 based on literature about computer security.

Accordingly, the query engine 112 can query the historical security model to perform probabilistic inference and prediction. For example, the query engine 112 can perform inference by enumeration. Inference by enumeration involves writing a query to execute against a Bayesian model. This query can provide a prediction of the state of the security domain 104 given the historical security model 118 and some predetermined input variables. The input variables may describe hypothetical states of the security domain 104. The query engine 112 can thus assess relationships between incident artifact, others of its kind, and determine if there is a correlation with another incident artifact relevant to a potential security incident.

The query engine 112 can represent a computer hardware and/or software architecture that can query the historical security model 118 to identify existing and/or future security threats. In this way, embodiments can make it possible to predict or infer future security incidents. Additionally, the historical security model 118 can make it possible to determine whether a particular system is vulnerable to (or infected by) a zero-day attack. A zero-day attack is a term that references a previously unknown security incident. The term, zero-day, is representative of the implication that computer installations cannot start protecting themselves from such attacks until the zero$^{th}$ day, i.e., the day of the attack (or the day the attack becomes widely known in the general public through publication in online blogs, journals, and the like).

Figure 2A:
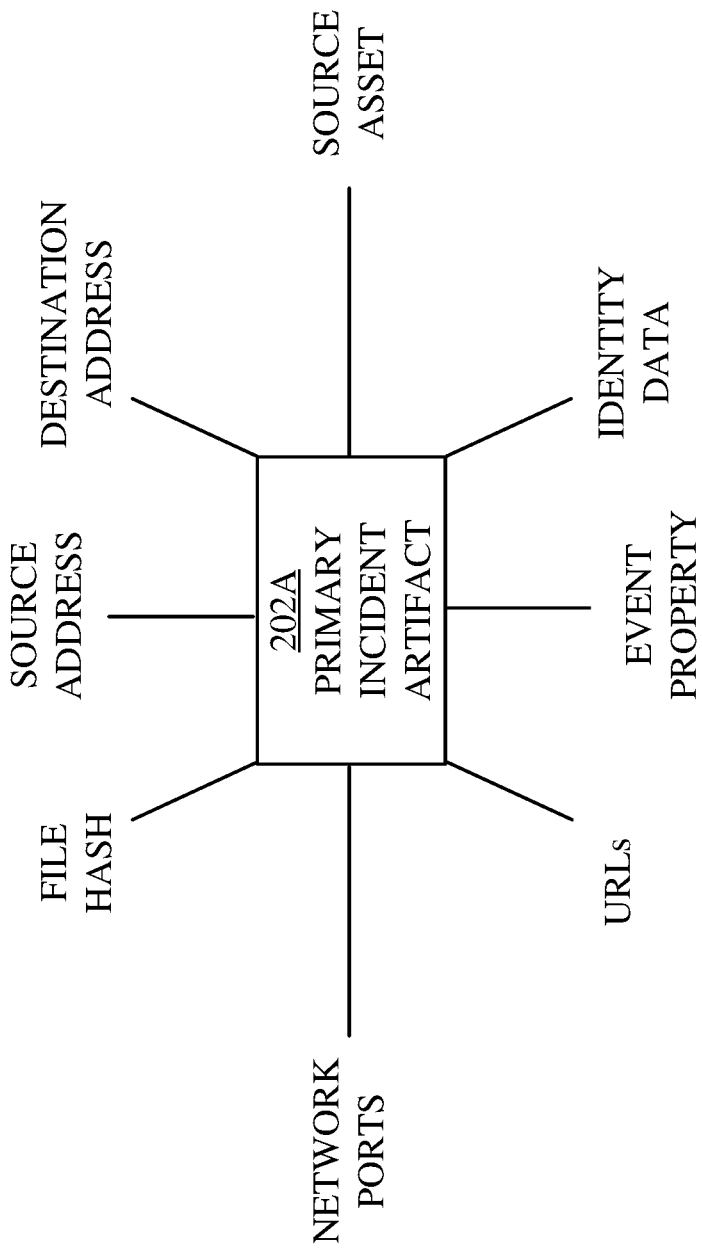
FIG. 2A is a block diagram of a primary incident artifact, in accordance with some embodiments of the present disclosure.

FIG. 2A is a block diagram of a primary incident artifact 202A, in accordance with some embodiments of the present disclosure. Artifacts can represent various empirical data about a security incident. More specifically, artifacts can include primary incident artifacts and secondary incident artifacts. The primary incident artifact 202A can include data that is directly related to the security incident. For example, the primary incident artifact 202A can include a file hash, a source, address, a destination address, a source asset, identity data, event property, uniform resource locators (URLs) and network ports.

The file hash is a unique string representation of a known executable file that may be involved in a security incident. The source address can be an internet protocol (IP) address of a compute node that launched the attack, e.g., security incident. The destination address can represent the IP address of the compute node targeted in the attack. The source asset can represent the type of compute node used in the security incident. The identity data can be a collection of any data about the attacker that is determined after the attack. The event property can describe the type of security incident. For example, the event property can describe a denial of service (DoS) attack or a stuxnet attack, for example. The URLs can identify the file locations of files within the security domain that were used in the attack. The network ports can identify the specific ports on the source and target compute nodes that the attacker used to launch and direct the attack.

Figure 2B:
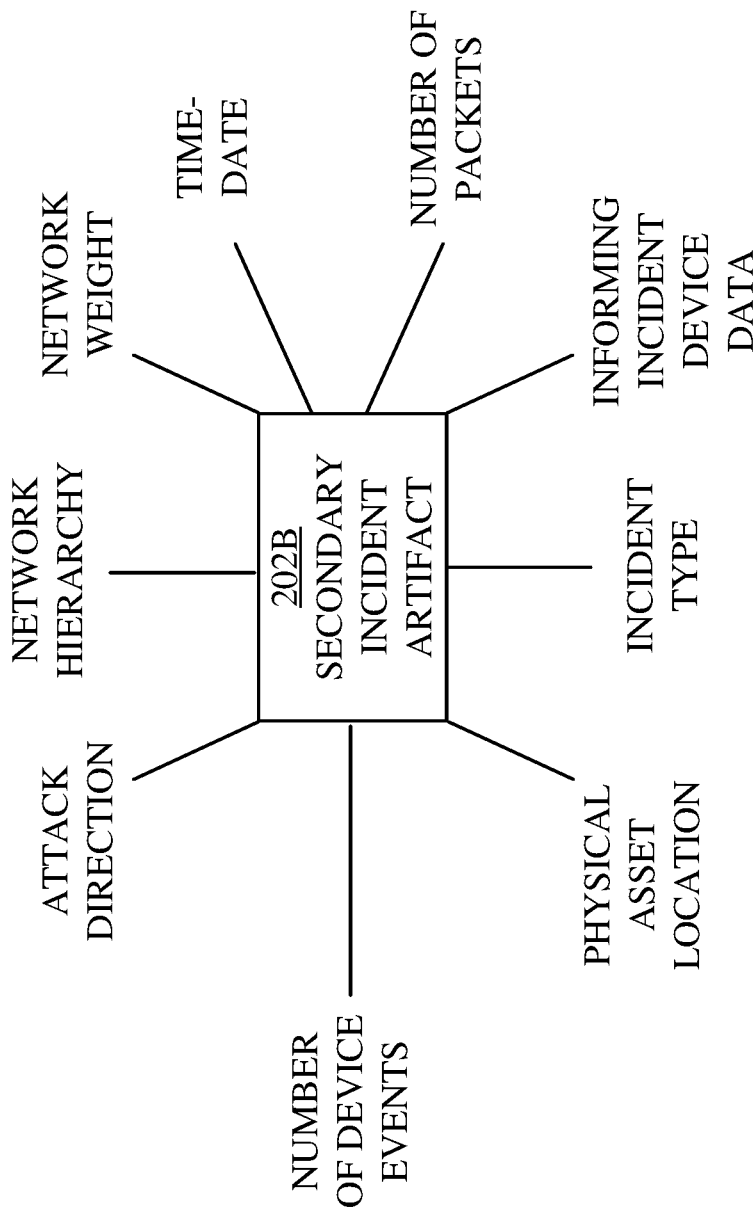
FIG. 2B is a block diagram of a secondary incident artifact, in accordance with some embodiments of the present disclosure.

FIG. 2B is a block diagram of a secondary incident artifact 202B, in accordance with some embodiments of the present disclosure. Herein, the secondary incident artifacts can include data that may not represent the actors and/or specific assets involved, but otherwise related to the security incident in ways that can provide some context for the attack. For example, the secondary incident artifact 202B can include an attack direction, network hierarchy, network weight, time-date, number of packets, informing incident device data, incident type, physical asset location, and the number of device events.

The attack direction can indicate whether the security incident was launched internally or externally. The network hierarchy can identify the specific network type where the attack occurred. The network weight can identify the volume of traffic on the network at the time of the security incident. The time-date can represent when the security incident began and/or a duration of the attack. The number of packets can represent the number of data packets that the attacker used in the attack. The informing incident device data can identify the IP address of the compute node that first identified the attack was taking place. The incident type can describe the type of attack. The physical asset location can identify the IP address of the compute node hosting any assets that may have been stolen or maliciously copied. The number of device events can indicate how many individual compute nodes were affected by the security incident.

Figure 3:
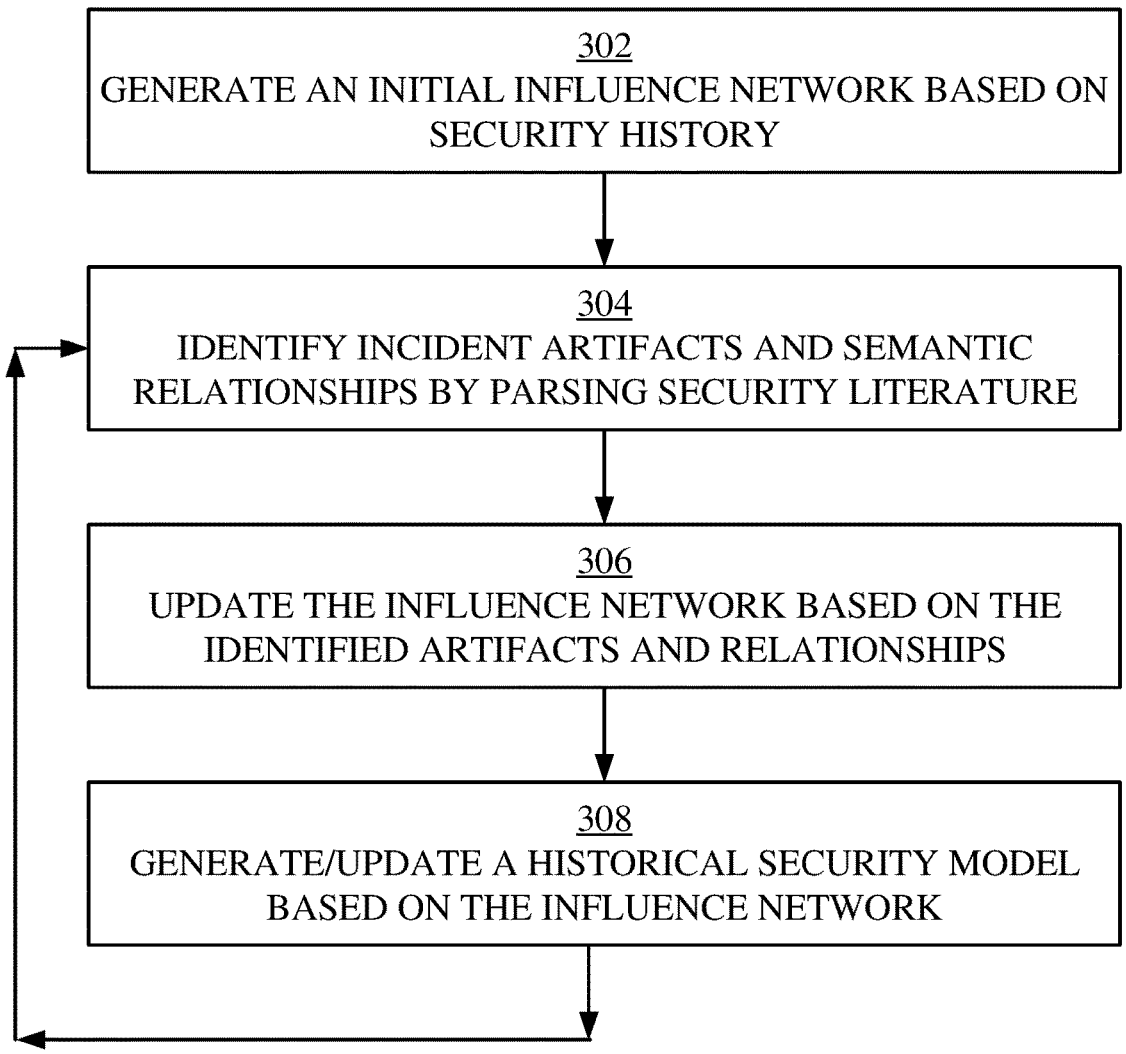
FIG. 3 is a process flow diagram of a method for generating a historical security model, in accordance with some embodiments of the present disclosure.

FIG. 3 is a process flow diagram of a method 300 for generating a historical security model, in accordance with some embodiments of the present disclosure. The method 300 can be performed by an incident modeler, data modeling suite, and dynamic security data parser, such as the incident modeler 106, data modeling suite 108, and dynamic security data parser 110 for the security domain 104 described with respect to FIG. 1. Referring back to FIG. 3, at operation 302, the incident modeler 106 can generate an initial influence network, that includes a predetermined set of incident artifacts and relationships between the incident artifacts. The initial influence network can be based on data retrieved from the data store platform 114. In some embodiments, a manual process can generate the initial influence network.

At operation 304, the dynamic security data parser 110 can identify incident artifacts and semantic relationships by parsing security literature. The dynamic security data parser 110 can identify incident artifacts in the security literature that are part of the security domain 104. Additionally, the dynamic security data parser 110 can identify new incident artifacts for the security domain. For example, the security literature can include articles about a newly discovered vulnerability that is relevant or may have an influential relationship with a known incident artifact of the security domain. In such a case, the dynamic security data parser 110 can identify a new incident artifact, and a semantic relationship between the new incident artifact and a known incident artifact.

At operation 306, the incident modeler 106 can update the influence network 116 based on the identified artifacts and relationships. In some embodiments, the incident modeler 106 can use natural language processing to score relationships between incident artifacts. The scores can include numeric values that indicate the amount and direction of influence between incident artifacts. Further, if the dynamic security data parser 110 identifies semantic relationships in conflict, the incident modeler 106 can resolve the conflict based on the scores for the conflicting relationships. Thus, a score of +80 indicating the degree of influence between artifact A to artifact B can indicate that artifact A influences artifact B. However, the incident modeler 106 can also identify a conflicting relationship between artifact A and artifact B, with a score of −90, indicating that artifact B influences artifact A. In such a case, because the absolute numeric value of the conflicting relationship is greater than the absolute numeric value of the first relationship, the incident modeler 106 can determine that the influence network 116 indicates that artifact B influences artifact A.

At operation 308, the data modeling suite 108 can generate (or update) the historical security model 118. Generating and updating the historical security model 118 can involve generating and updating a Bayesian network. More specifically, the data modeling suite 108 can generate the Bayesian network built using the structure laid out in the influence network 116 and populating the structure with variables and associated probabilities determined in operations 302 through 306. Additionally, the data modeling suite 108 can use the influence network 116 to identify the influences of the incident artifacts of the security domain 104, and limit the artifacts included in the historical security model 118 to the artifacts lying within the direction of influence for an attack. Based on the influence network 116, the data modeling suite 108 can determine the direction for all the incident artifacts in an incident including temporary (working hours) and abstract concepts (like a network). In this way, the data modeling suite 108 can efficiently generate a historical security model 118 of limited size that is useful for determining the likelihood of existing and future threats.

Figure 4:
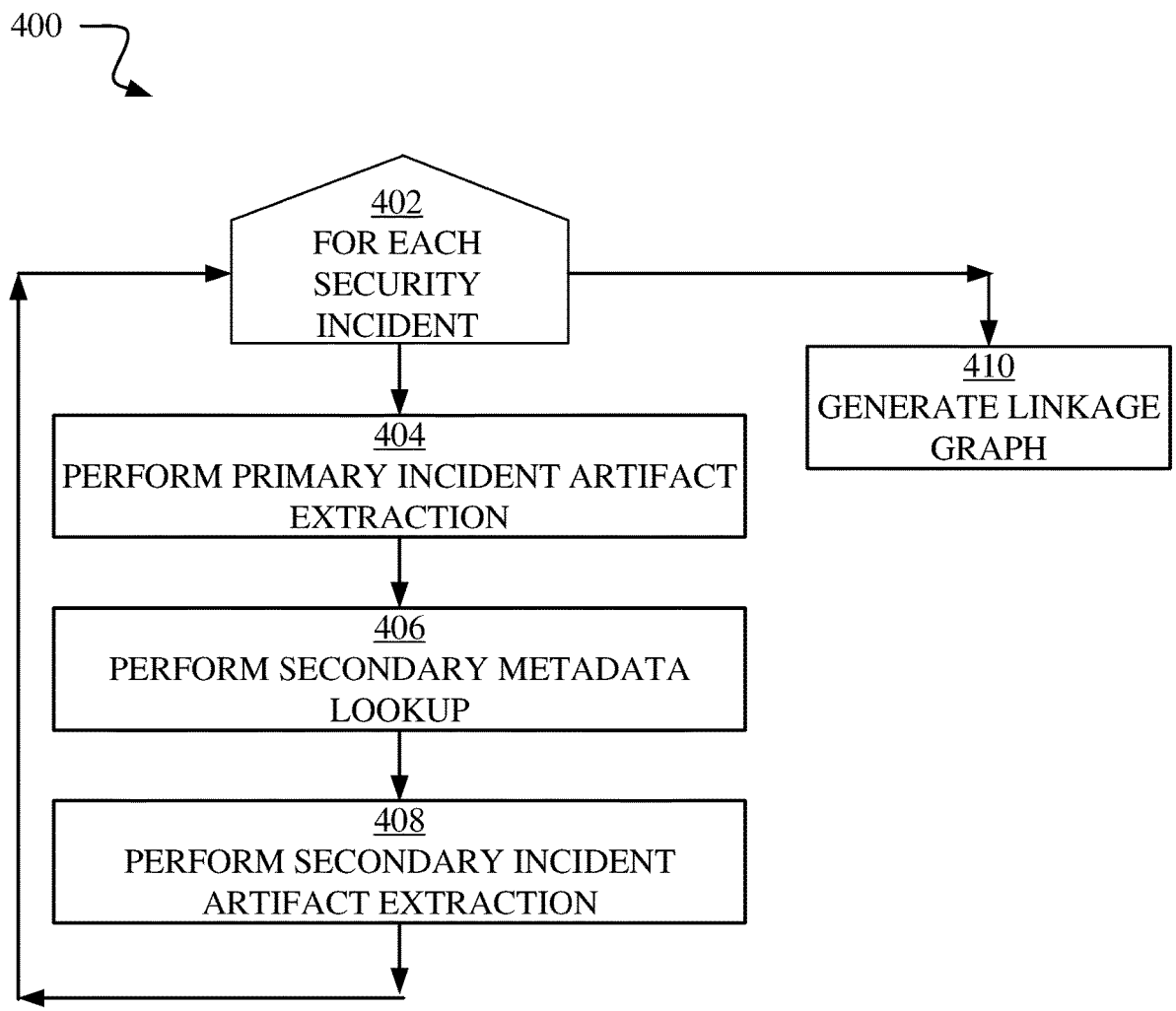
FIG. 4 is a process flow diagram of a method for generating a linkage graph, in accordance with some embodiments of the present disclosure.

FIG. 4 is a process flow diagram of a method 400 for generating a linkage graph, in accordance with some embodiments of the present disclosure. The method 400 can be performed by an incident modeler, such as the incident modeler 106, described with respect to FIG. 1. Referring back to FIG. 4, the security domain 104 can generate a datastore of incident artifacts when security incidents are identified. Accordingly, the incident modeler 106 can perform operations 402 through 408 for each security incident of the security domain 104. More specifically, at operation 404, the incident modeler 106 can perform primary incident artifact extraction. Performing primary artifact extraction can involve identifying primary incident artifacts, such as the primary incident artifact 202A described with respect to FIG. 2A. In some embodiments, the incident modeler 106 can retrieve information about security incidents from a data store platform, such as the data store platform 114 described with respect to FIG. 1. Additionally, the security domain 104 can maintain long term storage for datastores containing the primary and secondary artifacts about each security incident in the security domain 104.

At operation 406, the incident modeler can perform secondary metadata lookup. The secondary metadata lookup can involve identifying where to find relevant secondary incident artifacts. Thus, the incident modeler 106 can identify relevant types of artifacts for the security incident, and determine where the secondary incident artifacts are stored.

Accordingly, at operation 408, the incident modeler 106 can perform secondary incident artifact extraction. Performing secondary incident artifact extraction can involve determining secondary incident artifacts about each security incident, such as the secondary incident artifact 202B described with respect to FIG. 2B. Once the incident modeler 106 has extracted the primary and secondary incident artifacts for all the identified security incidents, the incident modeler 106 can proceed to operation 410.

At operation 410, the incident modeler 106 can generate a linkage graph. The linkage graph can identify common incident artifacts between security incidents and the probability of the incident artifacts occurring together. The linkage graph is thus useful for generating the influence network 116, which represents the influence incident artifacts have on each other. The linkage graph may not be a single graph, but rather a combination of two graph layers: an incident layer and an artifact layer. The incident and artifact layers of the linkage graph are described in greater detail with respect to FIGS. 5 and 6, respectively.

Figure 5:
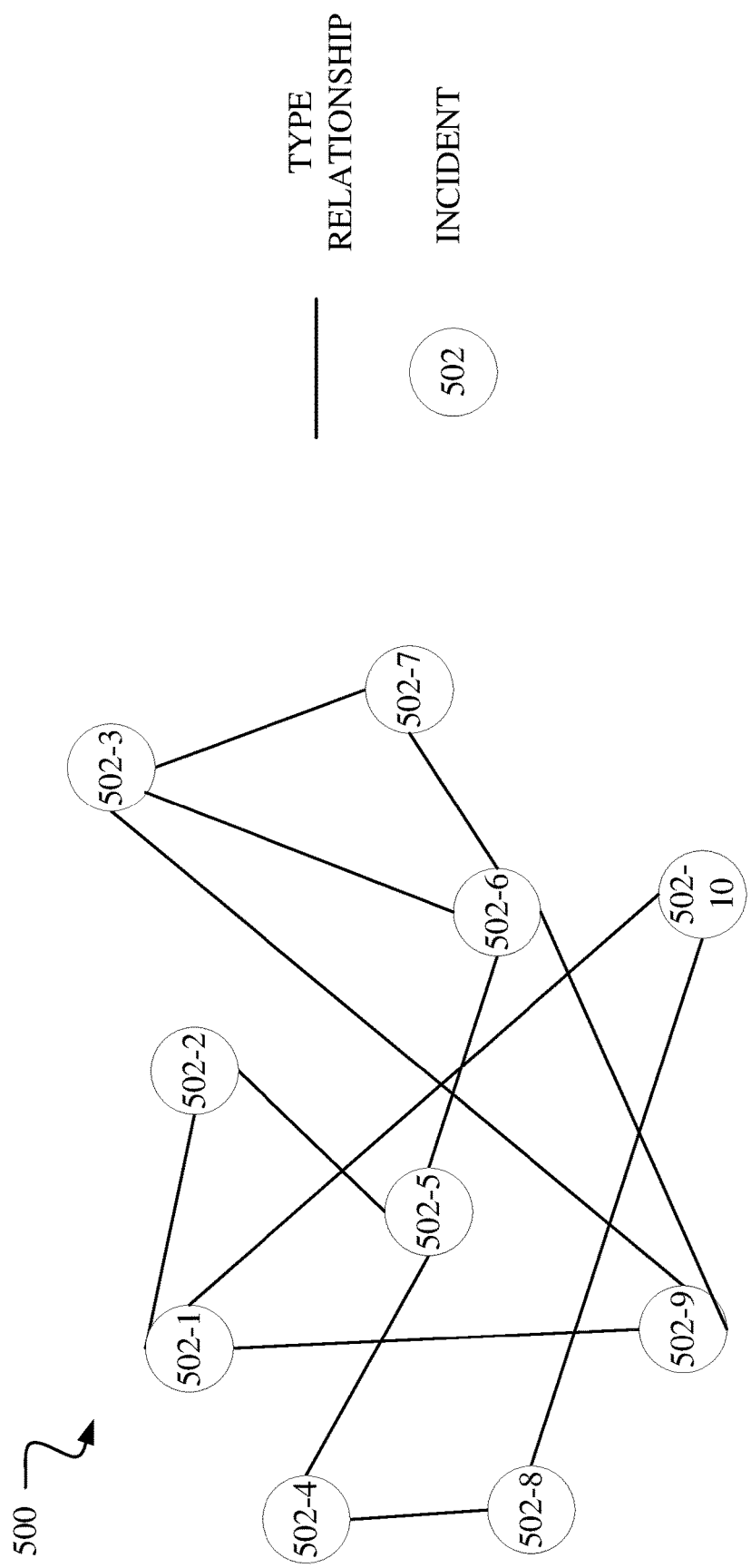
FIG. 5 is a block diagram of an incident layer of the linkage graph, in accordance with some embodiments of the present disclosure.

FIG. 5 is a block diagram of an incident layer 500 of the linkage graph, in accordance with some embodiments of the present disclosure. The incident layer 500 may be a graph of nodes connected by edges. In this example, the nodes represent incidents 502 (also referred to herein individually as incidents 502-1 through 502-10). The edges connecting incidents 502 can represent the common incident artifacts between the connected incidents. Thus, the edge connecting incidents 502-3 and 502-7 can represent common incident artifacts. The common incident artifacts can be any and/or various combinations of the primary incident artifact 202A and secondary incident artifact 202B. Common times, days, source IP addresses, and attack types identified in the edges of the incident layer 500 can help to direct the ultimate generation of the Bayesian network because the generated Bayesian network does not include a complete model of the security domain 104. Rather, the generation of the Bayesian network can be limited to include the incident artifacts that may be more likely to be involved in future and/or existing threats.

Figure 6:
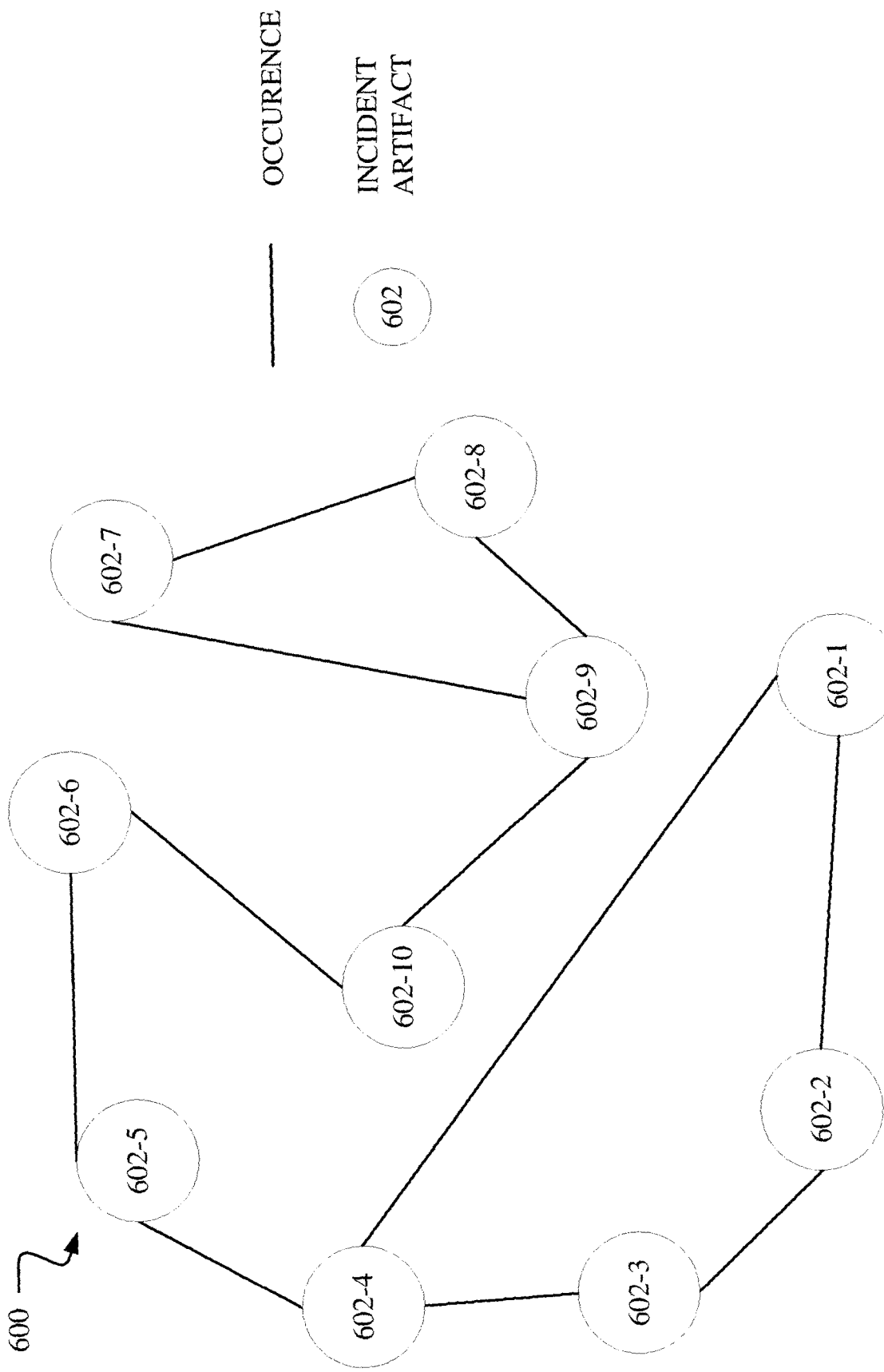
FIG. 6 is a block diagram of an artifact layer of the linkage graph, in accordance with embodiments of the present disclosure.

FIG. 6 is a block diagram of an artifact layer 600 of the linkage graph, in accordance with embodiments of the present disclosure. Similar to the incident layer 500, the artifact layer 600 may be a graph of nodes connected by edges. However, in the artifact layer, the nodes represent incident artifacts 602 (also referred to herein individually as incident artifacts 602-1 through 602-10). The edges connecting incident artifacts 602 can represent a probabilistic estimate of influence between the incident artifacts (during an attack). Thus, the edge connecting incident artifacts 602-7 and 602-8 can represent the probability that the incident artifacts 602-7, 602-8 are occurring in the same security incident. Identifying the probability that incident artifacts 602 are occurring together during a security incident can be useful in directing as limited generation of the historical security model. The historical security model can be generated by limiting the incident artifacts included to those that are more likely to be occurring together during a security incident. In this way, the generation of the Bayesian network can be limited to include the incident artifacts that may be more likely to be involved in future and/or existing threats.

Figure 7:
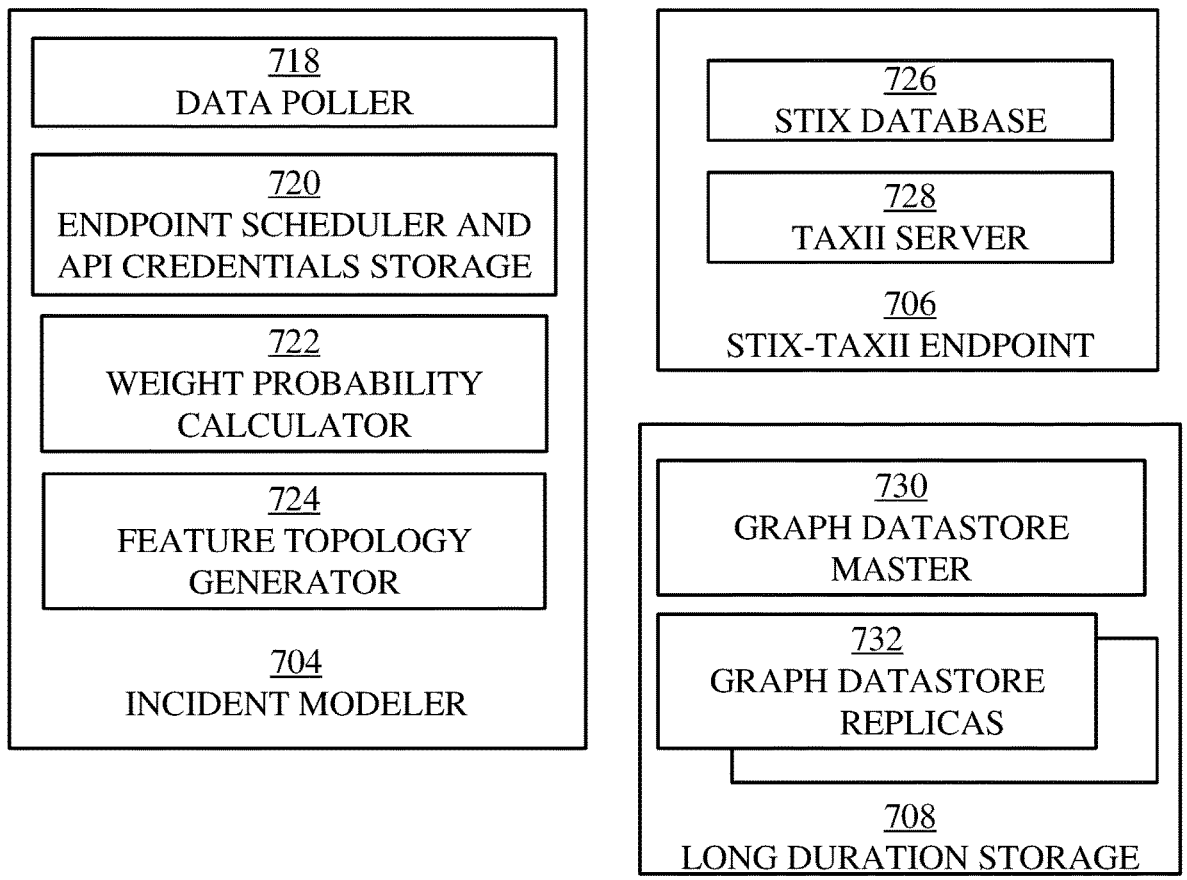
FIG. 7 is a block diagram of a system for generating the linkage graph, in accordance with some embodiments of the present disclosure.

FIG. 7 is a block diagram of a system 700 for generating the linkage graph, in accordance with some embodiments of the present disclosure. The system 700 includes a SIEM 702, incident modeler 704, structured threat information expression-trusted automated exchange of intelligence information (STIX-TAXII) endpoint 706, and a long duration storage 708. The SIEM 702, incident modeler 704, and STIX-TAXII endpoint 706 can be similar, respectively, to the data store platform 114, incident modeler 106, and dynamic security data parser 110 described with respect to FIG. 1.

Referring back to FIG. 7, the SIEM 702 can include a network and event collection pipeline 710, alert and incident generator 712, local incident storage 714, and representational state transfer application programming interface (RESTful API) service 716. The network and event collection pipeline 710 can process raw events and network data for the security domain 104. The alert and incident generator 712 can identify potential security incidents within the stream of raw event and network data. Accordingly, the alert and incident generator 712 can generate alerts for the potential security incidents. The alerts can include relevant incident artifacts regarding the potential security incident and stored in local incident storage 714. These alerts can include incident artifacts, the study of which can be useful for predicting security incidents. Accordingly, the alert and incident generator 712 can send the alerts to the long duration storage 708. The local incident storage 714 can be a computer-readable data storage device, for example.

The incident modeler 704 can include a data poller 718, endpoint scheduler and API credentials storage 720, weight probability calculator 722, and feature topology generator 724. The data poller 718 can retrieve incident artifacts from the local incident storage 714 about potential security incidents using the RESTful API service 716. The data poller 718 can also retrieve relevant security data from other orthogonal sources, such as the STIX-TAXII endpoint 706. Thus, the data poller 718 can use the endpoint scheduler and API credentials storage 720 to manage the secure retrieval of incident artifacts about known security threats from the STIX-TAXII endpoint 706. The weight probability calculator 722 can determine the probabilities that connected incident artifacts 602 from the artifact layer 600 are associated with a security incident. Determining these probabilities can be based on how often the incident artifacts occur together historically. The feature topology generator 724 can thus use the incident artifacts and other data to generate the nodes and edges for the incident layer 500 and artifact layer 600 of the linkage graph.

The STIX-TAXII endpoint 706 can include a STIX database 726 and TAXII server 728. STIX is a standardized language for describing information about security threats. STIX can describe the motivations, abilities, capabilities, and responses for a security threat. STIX can be shared via TAXII or other similar tools. Thus, the STIX database 726 can include a number of STIX files that describe various security threats.

The TAXII server 728 can be a tool that defines how information about security threats can be shared via online services and message exchanges. The TAXII server 728 can provide access to the STIX database 726 by providing a RESTful API service (not shown), that is compatible with common sharing models. For example, the TAXII server 728 can define four services, which can be selected, implemented, and combined into different sharing models. The four services include discovery, collection management, inbox, and poll. The discovery service provides an interface to learn what services an entity supports and how to interact with the services. The collection management service provides an interface to learn about and request subscriptions to data collection. The inbox service provides an interface for receiving content, through push messaging, for example. The poll service provides an interface to request content, through pull messaging, for example.

The long duration storage 708 can be a computer storage device that stores the linkage graph. The long duration storage 708 can include a graph datastore master 730 and graph datastore replicas 732. The graph datastore master 730 can represent the main database writer of the linkage graph. The graph datastore replicas 732 are redundant copies of the master to ensure high availability and scalability of service.

Figure 8:
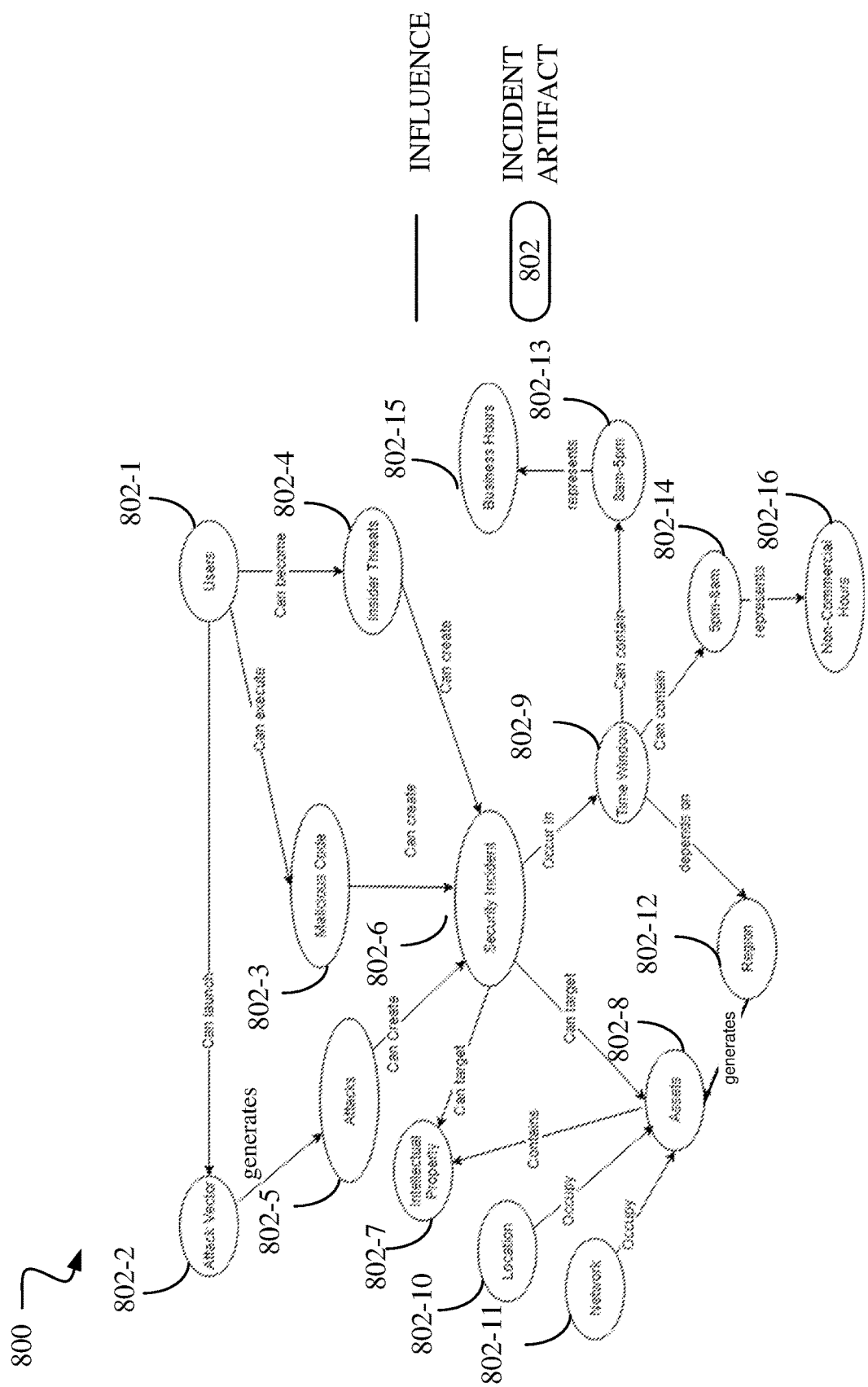
FIG. 8 is an example influence network, in accordance with some embodiments of the present disclosure.

FIG. 8 is an example influence network 800, in accordance with some embodiments of the present disclosure. The example influence network 800 can describe the nature of relationships in the security domain 104. The influence network 800 thus can represent a set of constraints regarding how to build the relationships between incident artifacts. In this example, the influence network 800 includes connected nodes that represent incident artifacts 802. Additionally, the connecting edges represent the relationships between the incident artifacts 802. In the influence network 800, the incident artifacts 802 include users 802-1, attack vector 802-2, malicious code 802-3, insider threats 802-4, attacks 802-5, security incident 802-6, intellectual property 802-7, assets 802-8, time window 802-9, location 802-10, network 802-11, region 802-12, the time from 8 a.m. until 5 p.m. 802-13, the time from 5 p.m. until 8 a.m. 802-14, business hours 802-15, and non-commercial hours 802-16. The directed edges connecting the incident artifacts 802 represent the influence and the direction of the influence. Thus, the users 802-1 provide the influence in the associations with the attack vector 802-2, malicious code 802-3, and insider threats 802-4. The direction of the edges represents the direction of influence. Thus, the users 802 can launch an attack vector 802-2, execute malicious code 802-3, and become insider threats 802-4.

The attack vector 802-2 generates attacks 802-5. Further, the attacks 802-5, malicious code 802-3, and insider threats 802-4 all can create a security incident 802-6. The security incident 802-6 can target intellectual property 802-7 and assets 802-8, and occur in a time window 802-9. Further, the assets 802-8 contain the intellectual property 802-7, and occupy a location 802-10 and a network 802-11.

The time window 802-9 depends on the region 802-12, which contains the assets 802-8. Additionally, the time window 802-9 can contain the time from 8 a.m. until 5 p.m. 802-13 and from 5 p.m. until 8 a.m. 802-14. The time from 8 a.m. until 5 p.m. 802-13 represent business hours 802-15. Further, the time from 5 p.m. until 8 a.m. 802-14 represent non-commercial hours 802-16.

In some embodiments, an initial influence network can be generated manually. While it may be challenging to build the historical security model 118 from the initial influence network, an influence network updated according to some embodiments may be useful for generating the historical security model 118.

Figure 9:
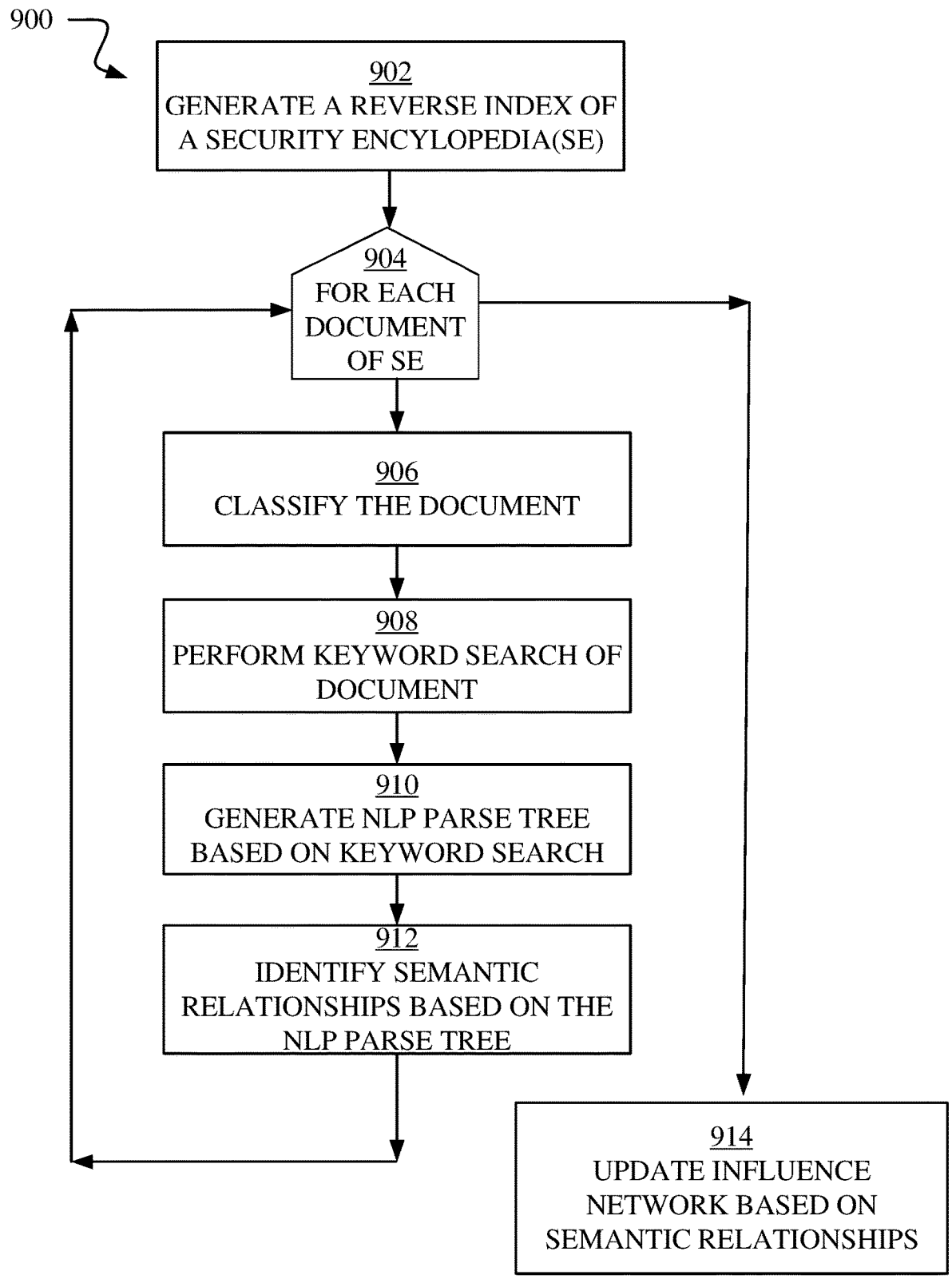
FIG. 9 is a process flow diagram of a method for updating the influence network, in accordance with some embodiments of the present disclosure.

FIG. 9 is a process flow diagram of a method 900 for updating the influence network 116, in accordance with some embodiments of the present disclosure. The method 900 can be performed by the incident modeler 106.

At operation 902, the incident modeler 106 can generate a reverse index of a security encyclopedia. The security encyclopedia can be a collection of articles and other documents relevant to computer and/or network security. In some embodiments, the dynamic security data parser 110 described with respect to FIG. 1 can include the security encyclopedia. The reverse index can provide a mapping from the content of a document to the location of the content in the document. In other words, the reverse index can direct the reader from a word to a document (or a web page and the like). Additionally, the reverse index can scale to a corpus of documents.

The security encyclopedia can include numerous documents. Accordingly, the incident modeler 106 can perform operations 904 through 912 for each of the documents.

At operation 906, the incident modeler 106 can classify the document. Classifying the document can involve a machine learning process, such as a support vector machine (SVM). The SVM can be a supervised classifier that maps labeled training data into points of a multi-dimensional space. In this way, the SVM can identify a hyperplane between the different classes of data. Once the hyperplane is defined, the SVM can classify future inputs based on their mapping to coordinates in the multi-dimensional space. In accordance with some embodiments, the SVM can classify each document into predetermined classes.

At operation 908, the incident modeler 106 can perform a keyword search of the document. The keyword search can be based on a bag of words model, wherein the bag of words includes a predetermined set of words. This bag of words can be periodically updated to remain current. Performing the keyword search can identify statements within the document relevant to the particular security-relevant word from the bag of words. In some embodiments, the bag of words can include the incident artifacts of the linkage graph. Additionally, in some embodiments, the incident modeler 106 can handle cases like multi-words expressions, words negations (e.g., not due to), and use a bag of words model to determine potential indicators of an influence of two key words in an article.

At operation 910, the incident modeler 106 can generate a natural language processing (NLP) parse tree based on the keyword search. More specifically, the incident modeler 106 can generate an NLP parse tree for each sentence and paragraph of each document. The NLP parse tree can be a tree graph structure that represents the rules that govern the sentence structure of each of the statements found in the keyword search. In this way, the NLP parse tree can identify the relationship between the words of each sentence identified in the keyword search. In some embodiments, the incident modeler can resolve temporal secondary linkages and other, complex concepts found as secondary indicators. For example, when analyzing words that refer to time, such as, noon, midnight, it can be useful for the incident modeler 106 to understand that noon means 12:00 p.m. and midnight means 12:00 a.m. In addition to time, potential secondary indicators can include network segments, locations, data transfer size, and geographic regions.

At operation 912, the incident modeler 106 can identify semantic relationships based on the NLP parse tree. The semantic relationships can represent the influences that incident artifacts identified in the keyword search have on each other.

The incident modeler 106 can repeat operations 904 through 912 for each document in the security encyclopedia. Additionally, the incident modeler can proceed to operation 914.

At operation 914, the incident modeler 106 can update the influence network 116 based on the semantic relationships. Updating the influence network 116 can involve changing the direction of influential relationships, adding new incident artifacts, and deleting incident artifacts. Accordingly, the incident modeler 106 can evaluate the accuracy of the influence network 116 in view of the semantic relationships identified as described above.

In this way, the incident modeler 106 can keep the influence network 116 up to date automatically by using data mined from security encyclopedias, articles, research papers, and the like. The incident modeler 106 can thus determine, given two security-related keywords in an article, which of the keywords influences the other. By using a bag of words model that includes keywords for the incident artifacts, the incident modeler 106 can identify semantic relationships between the incident artifacts for the influence network 116. In this way, the incident modeler 106 can determine, for example, that the "user" (keyword 1) was influenced by the "malicious code" (keyword 2). More specifically, the incident modeler 106 can determine that the "malicious code" attacked the "user."

Figure 10:
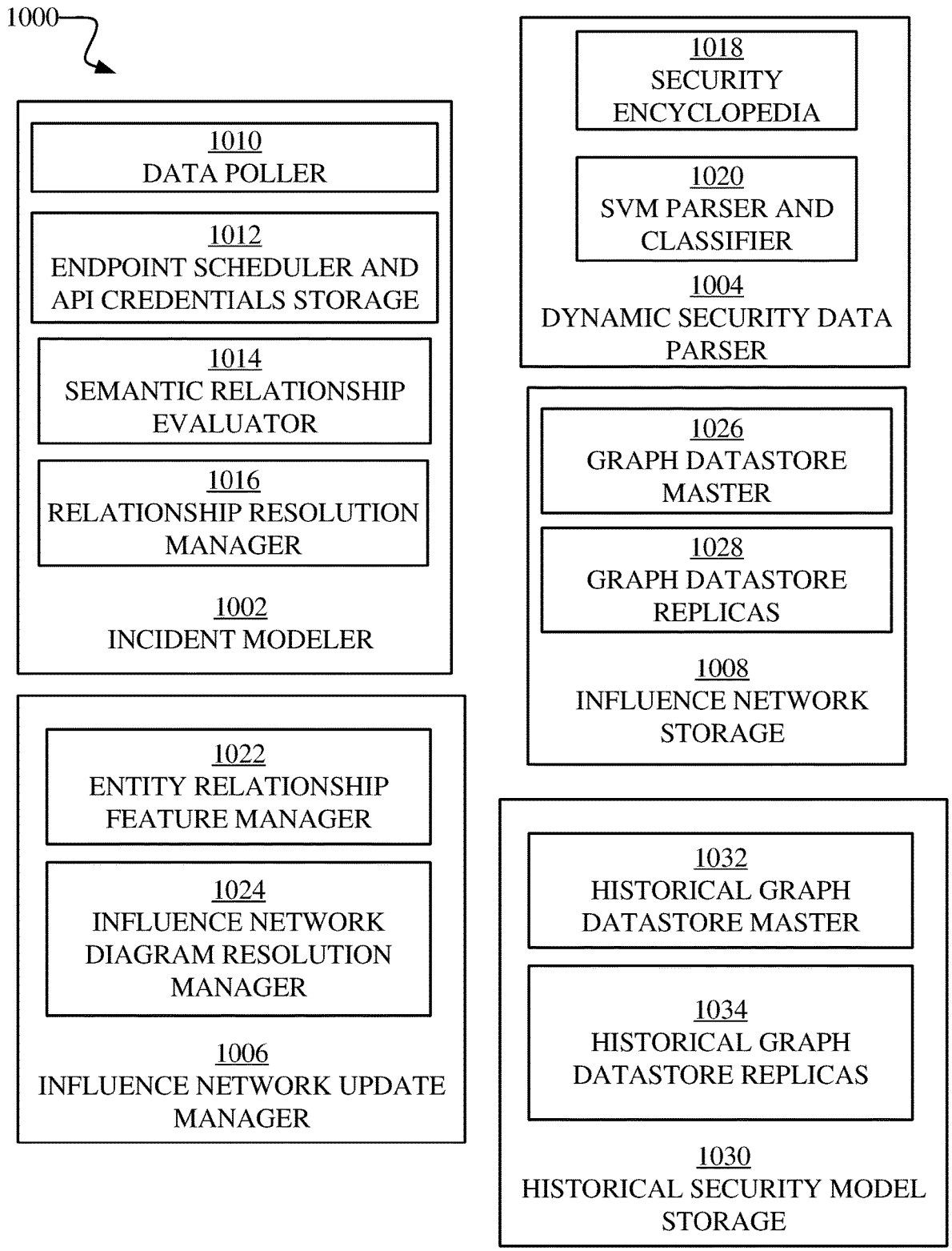
FIG. 10 is a block diagram of a system for updating the influence network, in accordance with some embodiments of the present disclosure.

FIG. 10 is a block diagram of a system 1000 for updating the influence network 116, in accordance with some embodiments of the present disclosure. The system 1000 includes an incident modeler 1002, dynamic security data parser 1004, influence network update manager 1006, and influence network storage 1008. The incident modeler 1002, and dynamic security data parser 1004 can be similar to the incident modeler 106 and dynamic security data parser 110 described with respect to FIG. 1. The dynamic security data parser 1004 can include a security encyclopedia 1018 and an SVM parser and classifier 1020. The security encyclopedia 1018 can be a collection of articles and other documents relevant to computer and/or network security.

The SVM parser and classifier 1020 can be a machine learning architecture that parses documents of the security encyclopedia 1018 and classifies them in the context of incident artifacts that are relevant to the influence network 116. In some embodiments, the SVM parser and classifier 1020 can perform operations 902 through 910 of the method 900 described with respect to FIG. 9.

Referring back to FIG. 10, the incident modeler 1002 can include a data poller 1010, endpoint scheduler and API credentials storage 1012, semantic relationship evaluator 1014, and relationship resolution manager 1016. The data poller 1010 and endpoint scheduler and API credentials storage 1012 can be similar to the data poller 718 and endpoint scheduler and API credentials storage 720 described with respect to FIG. 7. However, in contrast to the system 700, the data poller 1010 and endpoint scheduler and API credentials storage 1012 do not communicate with a SIEM or STIX-TAXII, but instead communicate and exchange data with the dynamic security data parser 1004, influence network update manager 1006, and influence network storage 1008. In some embodiments, the data poller 1010 can poll the dynamic security data parser 1004 for a poll of the security encyclopedia 1018 to initiate the method 900.

In some embodiments of the present disclosure, the semantic relationship evaluator 1014 can perform operation 912 of the method 900. Accordingly, the semantic relationship evaluator 1014 can process the NLP parse tree generated by the SVM parser and classifier 1020 to identify a set of semantic relationships of the influence network 116 impacted by the information found in the security encyclopedia 1018. Additionally, the semantic relationship evaluator 1014 can generate a numerical influence score for each of the semantic relationships based on the information in the documents. The numerical score can represent the direction and magnitude of influence between the incident artifacts of the semantic relationship.

The relationship resolution manager 1016 can identify conflicting scores of the identified semantic relationships. Further, the relationship resolution manager 1016 can unify conflicting causation relationships from multiple documents to get a final score. Conflicting causation relationships can arise from different documents with different perspectives on the relevant incident artifacts. For example, the semantic relationship evaluator 1014 can identify two different semantic relationships with two different perspectives between incident artifacts, ssh and "brute force." The term, ssh, is a computer application for a secure shell. The secure shell can be used for system administration and file transfers over insecure networks. The term, brute force, refers to a type of security incident wherein the malicious actor tries to break the security of the security domain 104 in a systematic way such as, trial and error. Brute force attacks can involve guessing a username and/or password, attempting to access a hidden web page by trying random URLS, guessing encryption keys, and the like. In one document, the semantic relationship may indicate that "ssh caused brute force." In other words, an attacker used the secure shell to perform a brute force attack. In contrast, the semantic relationship in the other document may indicate that "brute force caused ssh." This may represent a scenario where the brute force attacker incorporated the secure shell into the attack.

The influence network update manager 1006 can be a computer and/or software architecture that updates the influence network 116 based on the semantic relationship determinations of the incident modeler 1002. More specifically, the influence network update manager 1006 includes an entity relationship feature manager 1022 and influence network diagram resolution manager 1024. The entity relationship feature manager 1022 can extract the entity and relationships and send these to the relationship resolution manager 1016 which performs the updates. More specifically, the entity relationship feature manager 1022 can identify semantic relationships in the influence network 116 that are impacted by the semantic relationship influences that the incident modeler identifies. Additionally, the entity relationship feature manager 1022 can identify new semantic relationships and/or incident artifacts to add to the influence network 116. The entity relationship feature manager 1022 can also identify incident artifacts to delete from the influence network 116. Accordingly, the relationship resolution manager 1016 can change the direction and magnitude of the influence of existing semantic relationships and add or delete semantic relationships.

The influence network diagram resolution manager 1024 can identify conflicts between the semantic relationships that the incident modeler 106 identifies and existing semantic relationships in the influence network 116. In this way, the influence network diagram resolution manager 1024 can modify the magnitude or direction of influence between two incident artifacts. Additionally, the influence network diagram resolution manager 1024 can add and/or delete semantic relationships from the influence network 116.

In addition to the herein cited sources of information used to build the influence network 116, the incident modeler 1002 may encounter new terms and incident artifacts for which no knowledge exists in the influence network 116 or the security encyclopedia 1018 (which may simply be out of date). Accordingly, the incident modeler 1002 can use an Internet Security Database Lookup, and/or record and document interactive feedback from a data scientist and/or other user of the incident modeler 1002.

The influence network storage 1008 can be a computer storage device that stores the linkage graph. The influence network storage 1008 can include a graph datastore master 1026 and graph datastore replicas 1028. The graph datastore master 1026 can represent the main database writer of the influence network 116. The graph datastore replicas 1028 are redundant copies of the master to ensure high availability and scalability of service.

Additionally, the system 1000 can include historical security model storage 1030, which can be a computer storage device that stores versions of the historical security model 118. More specifically, the historical security model storage 1030 can include a historical graph datastore master 1032 and historical graph datastore replicas 1034. The historical graph datastore master 1032 can represent the main database writer of the historical security model 118. Accordingly, the historical graph datastore replicas 1034 are redundant copies of the master to ensure high availability and scalability of service.

Figure 11:
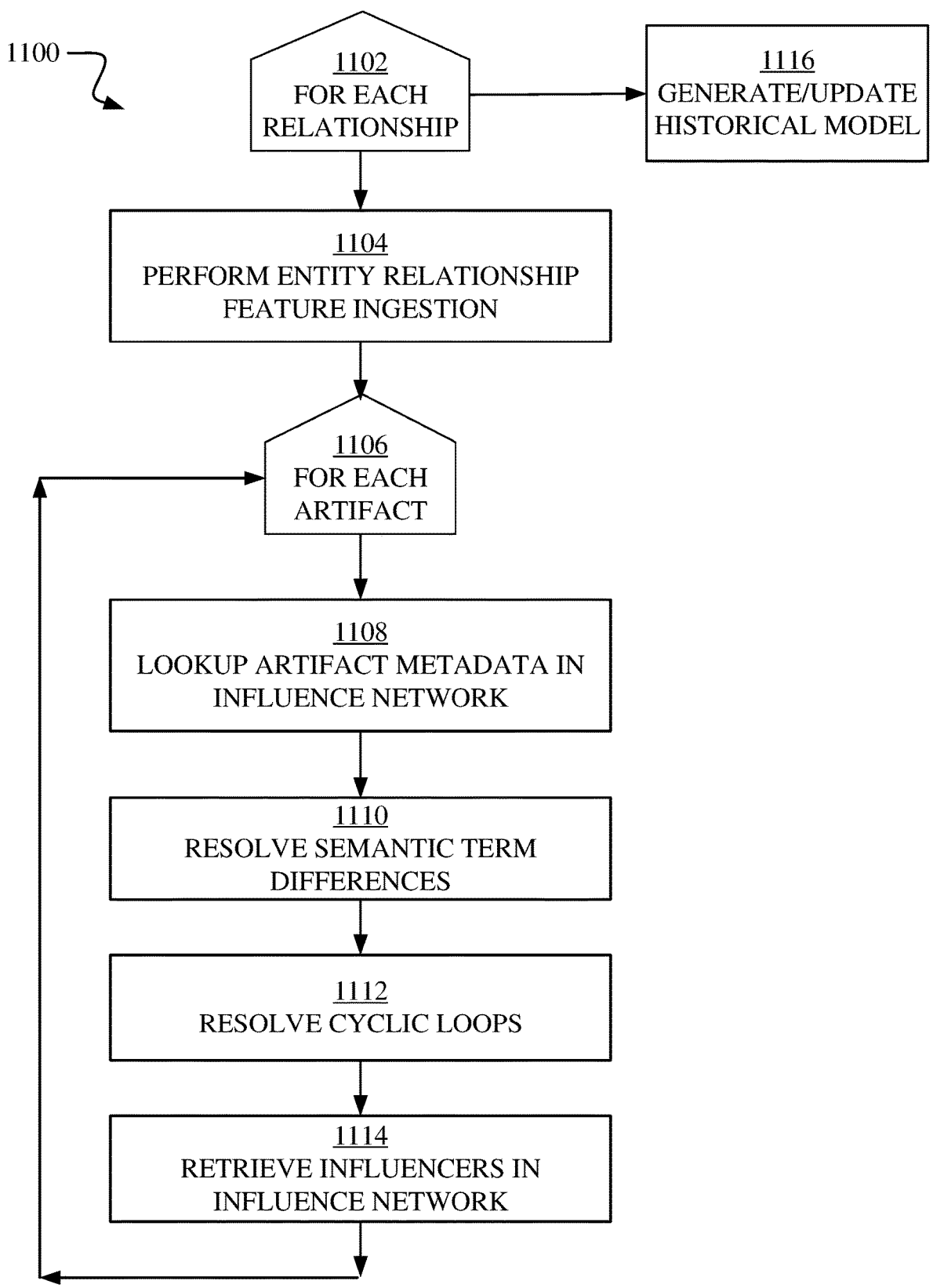
FIG. 11 is a process flow diagram of a method for generating and updating the historical security model, in accordance with some embodiments of the present disclosure.

FIG. 11 is a process flow diagram of a method 1100 for generating and updating the historical security model 118, in accordance with some embodiments of the present disclosure. The method 1100 can be performed by the data modeling suite 108. The data modeling suite 108 may thus perform operations 1102 through 1106 for each of the identified semantic relationships.

At operation 1104, the data modeling suite 108 can perform a relationship feature ingestion. The relationship feature ingestion can involve retrieving the relevant data from the influence network 116, and long duration storage of incident artifacts for the security domain 104. Thus, for each identified semantic relationship, the data modeling suite 108 can retrieve a history of the relevant incident artifacts from long duration storage, and the current version of the influence network 116.

Each semantic relationship can include two incident artifacts, which the data modeling suite 108 can process separately. Thus, the data modeling suite 108 can perform operations 1106 through 1114 for each incident artifact in the current semantic relationship.

At operation 1108, the data modeling suite 108 can lookup artifact metadata in the influence network 116. The artifact metadata can represent recorded values of specific artifacts in relation to a historical security incident.

At operation 1110, the data modeling suite 108 can resolve semantic term differences for each unknown term encountered. Resolving semantic term differences can involve either a search for the semantic meaning of the new term from an internet based database software. Alternatively, the data modeling suite can collect the number of identified words for integration and use the Levenshtein distance to estimate how closely related the word is to an element that already exists in the influence network.

At operation 1112, the data modeling suite 108 can resolve cyclic loops. Resolving cyclic loops can involve identifying potential loops involving the current incident artifact. The term, cyclic loop, can describe a scenario wherein navigating the graph of the influence network 116 can result in an infinite traversal. Accordingly, the data modeling suite 108 can identify cyclic loops for the incident artifact such that the data modeling suite 108 does not navigate the cyclic loop more than once.

At operation 1114, the data modeling suite 108 can retrieve influencers in the influence network 116. The influencers can represent the incident artifacts related to the current artifact that influence the current artifact. In other words, if the current artifact is the soft shell, an example influencer can be a brute force attack. If the current artifact is an SSH session (not a soft shell) and the influencer is a brute force attack, it may be possible to draw a linkage from other incident artifacts that represents a threat actor (such as a username) that triggered the SSH session.

At operation 1116, the data modeling suite 108 can generate or update the historical security model. Updating the historical security model can include associating each semantic relationship in the historical security model 118 with the probability value of the relationship occurring in the context of a security incident over the time period of the long duration storage.

In some embodiments, the data modeling suite 108 can create a conditional distribution table for semantical relationship in the influence network 116. More specifically, the data modeling suite 108 can examine all the incident artifacts from the influence network 116 and decide whether to add new relationship (arcs); and if so, determine the direction of influence and the other incident artifacts impacted by the new relationship. Additionally, the data modeling suite 108 can add each associated incident artifact to the historical security model 118 based on the structure of the influence network 116. After the data modeling suite 108 has added new data into the historical security model, the data modeling suite 108 can periodically determine whether the model may overfit or underfit new data.

Figure 12A:
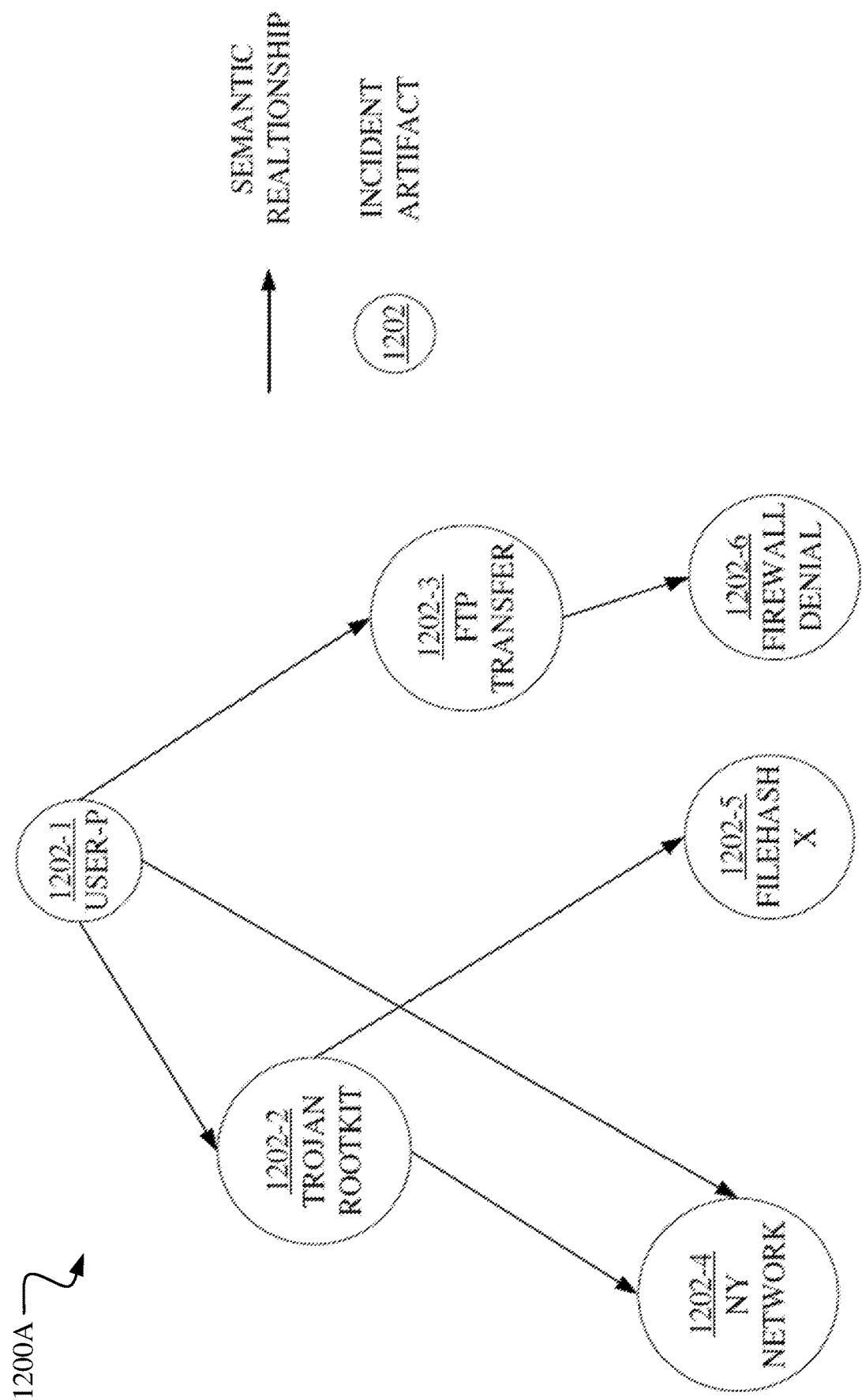
FIG. 12A is a block diagram of a portion of an example historical security model, in accordance with some embodiments of the present disclosure.

FIG. 12A is a block diagram of a portion of an example historical security model 1200A, in accordance with some embodiments of the present disclosure. The example historical security model 1200A includes connected incident artifacts 1202. The connecting lines represent semantic relationships and the direction of influence.

In this example, incident artifact 1202-1 (user-P) has semantic relationships with incident artifact 1202-2 (trojan toolkit) and incident artifact 1202-3 (file transfer protocol [FTP] transfer). Additionally, the trojan toolkit has semantic relationships with incident artifact 1202-4 (New York (N.Y.) network) and incident artifact 1202-5 (file hash X). The file hash X can represent a unique identifier for a file that was part of the attack (e.g., as the executable). Further the FTP transfer has a semantic relationship with incident artifact 1202-6 (firewall denial). Firewall denial can refer to the rejection of a request for access beyond the firewall to an external network.

In addition to generating the example historical security model 118, the data modeling suite 108 can also periodically prune semantic relationships to increase the historical security model's accuracy. In some embodiments, the data modeling suite 108 can use a modified tree-augmented naïve Bayes (TAN) approach.

With the TAN approach, the data modeling suite 108 can periodically reduce the amount of noise in the historical security model 118 and arrive at a mathematically minimum description length hypothesis. Given a set of nodes (e.g., incident artifacts 1202) and their parents, the data modeling suite 108 can use a Monte Carlo simulation to rank the list of parents (nodes at the top [roots] of the tree structure). The highest ranked parents are kept while the lower ranked are pruned away.

For example, the data modeling suite 108 can determine that removing the semantic relationship between the user-P and the NY network improves the historical security model's accuracy. As such, the data modeling suite 108 can prune this relationship.

Figure 12B:
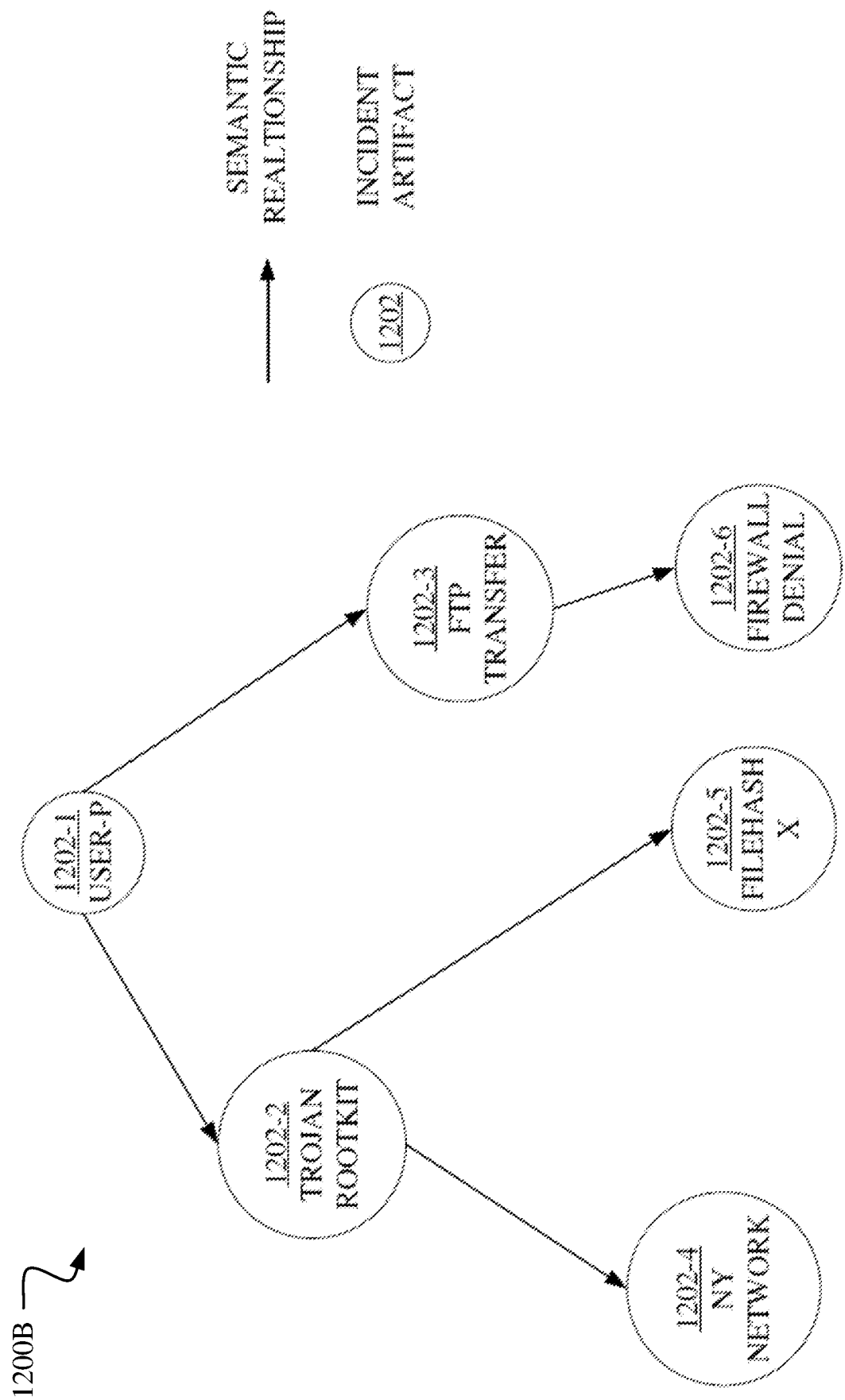
FIG. 12B is a block diagram of a pruned historical security model, in accordance with some embodiments of the present disclosure.

FIG. 12B is a block diagram of a pruned historical security model 1200B, in accordance with some embodiments of the present disclosure. The example historical security model 1200B includes connected incident artifacts 1202. The pruned historical security model 1200B includes all the incident artifacts 1202 of the example historical security model 1200A. In contrast to the example historical security model 1200A though, the pruned historical security model 1200B includes all the semantic relationships except that between the user-P and NY network.

In some embodiments, the data modeling suite 108 can prune edges which are determined to have a minimal impact on accuracy. In other words, the data modeling suite 108 can prune semantic relationships from the historical security model 118 and run simulations of queries against the pruned model and determine the accuracy of the pruned model. If the accuracy score is an improvement over the current version of the historical security model 118, the data modeling suite 108 can replace the historical security model 118 with the pruned version. In some embodiments, the data modeling suite 108 can score the historical security model 118 based on current data sets of the historical security incidents through supervised learning after each simulation.

Figure 13:
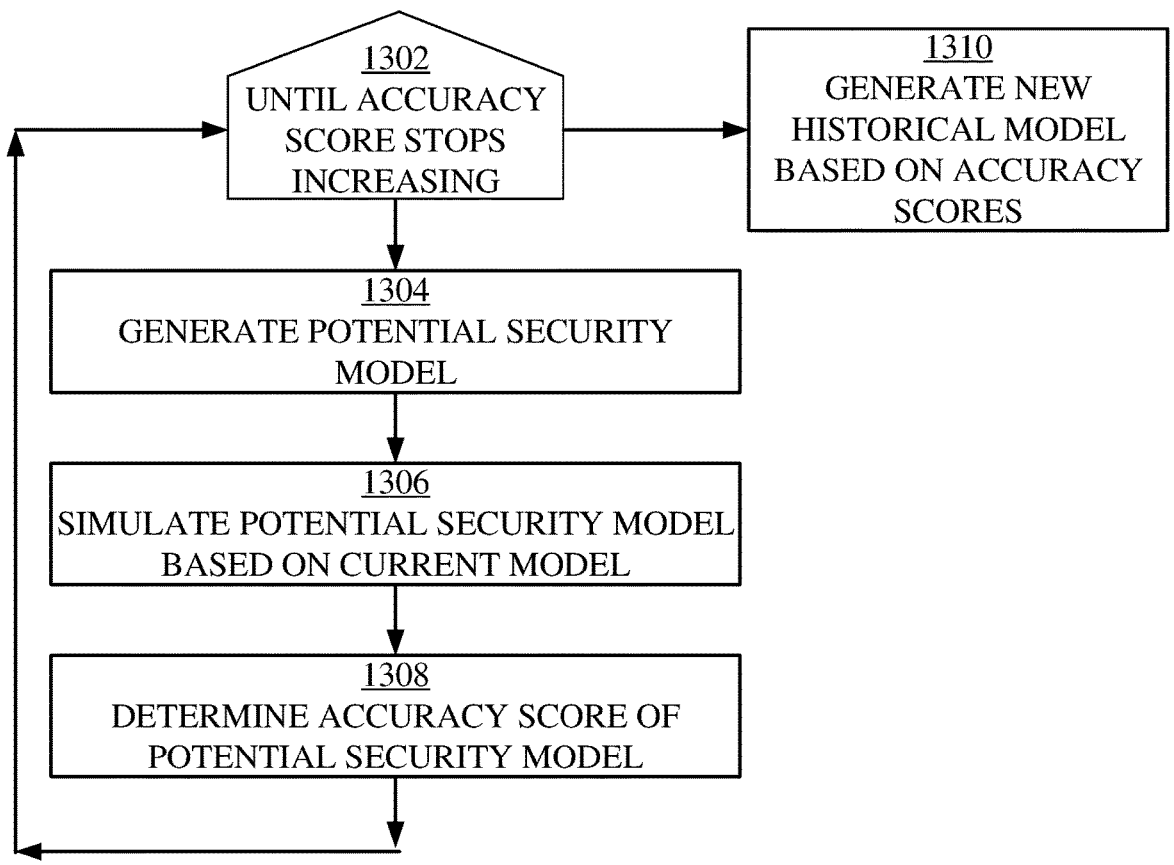
FIG. 13 is a process flow diagram of a method for updating the historical security model, in accordance with some embodiments of the present disclosure.

FIG. 13 is a process flow diagram of a method 1300 for updating the historical security model 118, in accordance with some embodiments of the present disclosure. The method 1300 can be performed by the data modeling suite 108. The data modeling suite 108 may thus perform operations 1302 through 1308 until an accuracy scored of the historical security model 118 stops increasing.

At operation 1304, the data modeling suite 108 can generate a potential security model. For example, the data modeling suite 108 can prune one or more semantic relationships from the historical security model 118. Other examples can include modifications such as, reversing the direction of a semantic relationship, removing a node, and the like.

At operation 1306, the data modeling suite 108 can simulate the potential security model based on the current model. Simulating the potential security model can include using the query engine 112 to have the potential security model classify known security scenarios, whether they involve known security incidents and/or known safe security scenarios. The current model may be already stored.

At operation 1308, the data modeling suite 108 can determine an accuracy score of the potential security model. The accuracy score can be determined based on how accurately the potential security model is able to perform the security scenario classifications.

Once the accuracy score stops increasing, the method 1300 can flow to operation 1310, where the data modeling suite 108 can generate a new historical security model based on the accuracy scores. In other words, the data modeling suite 108 can replace the historical security model 118 with the potential security model having the comparatively highest accuracy score of all the potential security models generated and evaluated in operations 1304 through 1308.

Figure 14:
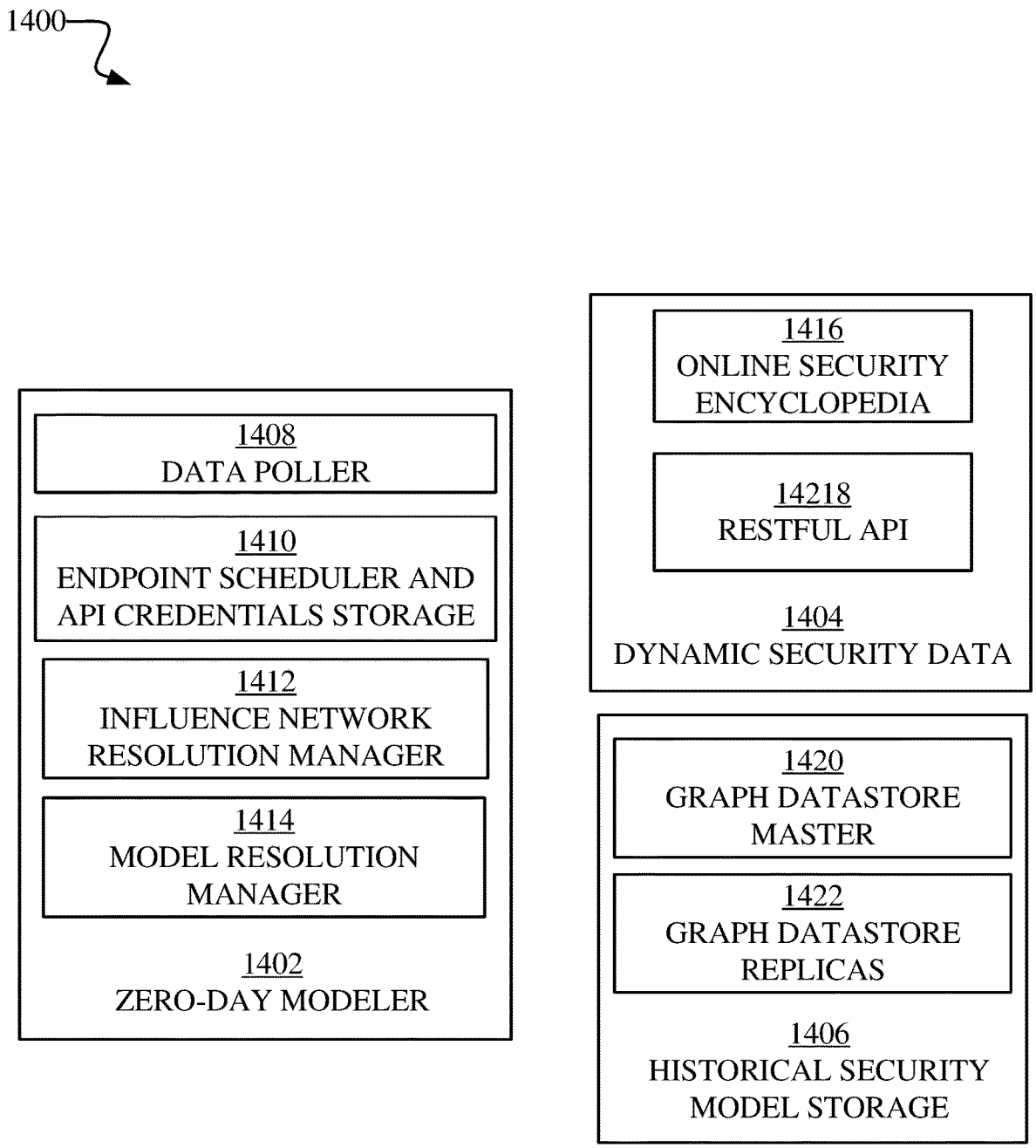
FIG. 14 is a block diagram of a system for zero-day modeling, in accordance with some embodiments of the present disclosure.

FIG. 14 is a block diagram of a system 1400 for zero-day modeling, in accordance with some embodiments of the present disclosure. The system 1400 includes a zero-day modeler 1402, dynamic security data 1404, and historical security model storage 1406.

The zero-day modeler 1402 can be similar to the incident modeler 1002 described with respect to FIG. 10. For example, the zero-day modeler 1402 can include a data poller 1408 and an endpoint scheduler and API credentials storage 1410, which may be similar to the data poller 1010 and an endpoint scheduler and API credentials storage 1012 described with respect to FIG. 10. Additionally, the zero-day modeler 1402 can include an influence network resolution manager 1412 and a model resolution manager 1414. The influence network resolution manager 1412 can update the influence network based on new data mined from the data poller 1408 and keyword association processor. The model resolution manager 1414 can find related security incident artifacts in the Bayesian network related to the new data from the influence network and perform adjustments to the Bayesian network based on the new semantic data.

Figure 16:
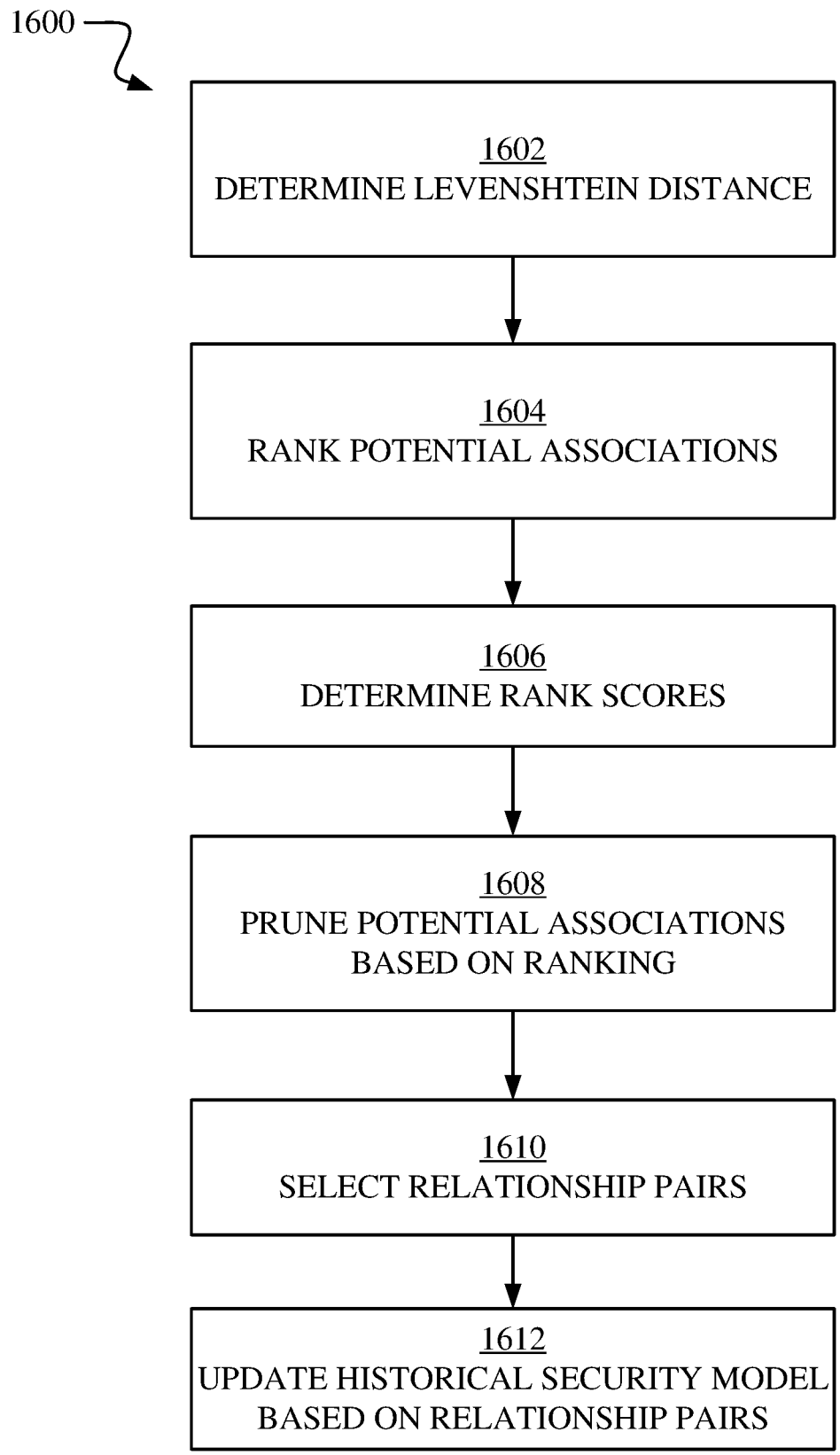
FIG. 16 is a process flow diagram of a method to identify a zero-day attack, in accordance with some embodiments of the present disclosure.

In some embodiments, the zero-day modeler 1402 can perform operations 1602 through 1612 of the method 1600 described with respect to FIG. 16. In this way, the zero-day modeler 1402 can generate a version of the historical security model 118 that can be used to predict and/or identify a zero-day attack. Generating this model is described in greater detail with respect to FIG. 16.

Referring back to FIG. 14, the dynamic security data 1404 can include an online security encyclopedia 1416 and a RESTful API 1418. The online security encyclopedia 1418 can be a collection of articles and other documents relevant to computer and/or network security. The RESTful API 1418 can be similar to the RESTful API service 716 described with respect to FIG. 7. More specifically, the RESTful API 1418 can provide access to the information stored in the online security encyclopedia 1416.

Additionally, the system 1400 can include historical security model storage 1406, which can be a computer storage device that stores versions of the historical security model 118. More specifically, the historical security model storage 1406 can include a graph datastore master 1420 and graph datastore replicas 1422. The graph datastore master 1420 can represent the main database writer of the historical security model 118. Accordingly, the graph datastore replicas 1422 can represent redundant copies of the master to ensure high availability and scalability of service.

Figure 15:
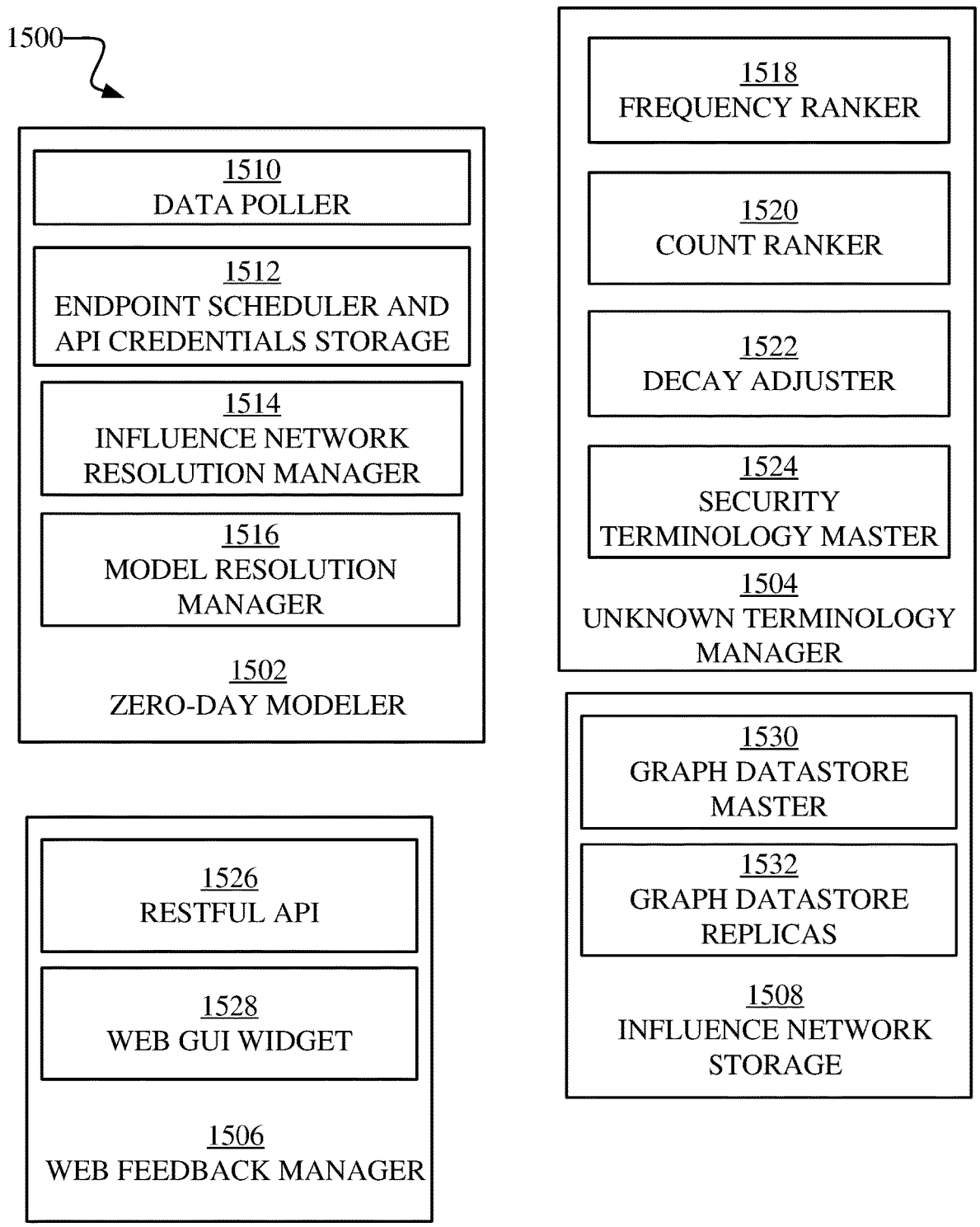
FIG. 15 is a block diagram of a system for zero-day modeling, in accordance with some embodiments of the present disclosure.

FIG. 15 is a block diagram of a system 1500 for zero-day modeling, in accordance with some embodiments of the present disclosure. The system 1500 includes a zero-day modeler 1502, unknown terminology manager 1504, web feedback manager 1506, and influence network storage 1508.

The zero-day modeler 1502 can be similar to the zero-day modeler 1402 described with respect to FIG. 14. The zero-day modeler 1502 can include a data poller 1510 and an endpoint scheduler and API credentials storage 1512, which may be similar to the data poller 1408 and an endpoint scheduler and API credentials storage 1410 described with respect to FIG. 14. Additionally, the zero-day modeler 1502 can include an influence network resolution manager 1514 and a model resolution manager 1516. The influence network resolution manager 1514 can update the influence network based on new data mined from the data poller 1510 and keyword association processor. The model resolution manager 1516 can find related security incident artifacts in the Bayesian network related to the new data from the influence network and perform adjustments to the Bayesian network based on the new semantic data.

The unknown terminology manager 1504 can identify new security-relevant terminology to incorporate into the influence network 116. Accordingly, the unknown terminology manager 1504 can include a frequency ranker 1518, count ranker 1520, decay adjuster 1522, and security terminology master 1524. The security terminology master 1524 can be a dictionary of predetermined words, phrases, and other symbols that are relevant to the security domain 104. In some embodiments, the unknown terminology manager 1504 can generate and update the security terminology master 1524.

The frequency ranker 1518 can identify unknown security terminology through online literature and/or interactive feedback based on what is already known and stored in the security terminology master 1524. Additionally, the frequency ranker 1518 can keep track of how frequently the unknown security terminology appears in the online literature.

The count ranker 1520 can rank the frequency counts of each identified security terminology. Ranking the frequency counts can make it possible to identify security terminology that is becoming increasingly relevant.

The decay adjuster 1522 can automatically update the frequency counts of the identified security terminology based on how much time passes between mentions. Thus, the decay adjuster 1522 can decrement the frequency counts after some predetermined amount of time passes.

The web feedback manager 1506 can enable a user to interact with the zero-day modeler 1502. In some embodiments, the web feedback manager 1506 can include a RESTful API 1526 and a web graphical user interface (GUI) widget. The RESTful API 1526 can provide an interface to the web GUI widget 1528, which can display information about potential zero-day attacks, and enable a user to provide specific parameters, criteria, and the like to aid in the search for zero-day attacks.

Additionally, the system 1500 can include influence network storage 1508, which can be a computer storage device that stores versions of the influence network 116. More specifically, the influence network storage 1508 can include a graph datastore master 1530 and graph datastore replicas 1532. The graph datastore master 1530 can represent a current version of the influence network 116. Accordingly, the graph datastore replicas 1532 can represent redundant copies of the master to ensure high availability and scalability of service.

FIG. 16 is a process flow diagram of a method 1600 to identify a zero-day attack, in accordance with some embodiments of the present disclosure. The method 1600 can be performed by the dynamic security data parser 110 on the unknown security terminology identified by the unknown terminology manager 1504.

At operation 1602, the dynamic security data parser 110 can determine a Levenshtein distance between the unknown security terminology and the incident artifacts of the influence network 116.

At operation 1604, the dynamic security data parser 110 can rank potential associations between the unknown security terminology and the incident artifacts based on the Levenshtein distances.

At operation 1606, the dynamic security data parser 110 can determine rank scores. The rank scores can represent how highly or lowly ranked each of the associations is.

At operation 1608, the dynamic security data parser 110 can prune potential associations based on the ranking. For example, the dynamic security data parser 110 can use a predetermined threshold below which, potential associations are eliminated.

At operation 1610, the dynamic security data parser 110 can select relationship pairs. The relationship pairs can be selected based on the associations whose rankings exceed the predetermined threshold.

At operation 1612, zero-day modeler 1502 can generate a new historical security model for zero-day attacks. The zero-day modeler 1502 is previously described in FIG. 15. The zero-day modeler 1502 can inject data from the data poller 1510 and keyword association processor and create an arc in the influence network 116 based on the inferred relationship extracted from the keyword processor. Once the arc has been added, the zero-day modeler 1502 can update the Bayesian network by linking the nodes containing a semantic label found from the keyword processor to their best associated node in the graph based on the semantic relationship now defined in the influence network.

Figure 17:
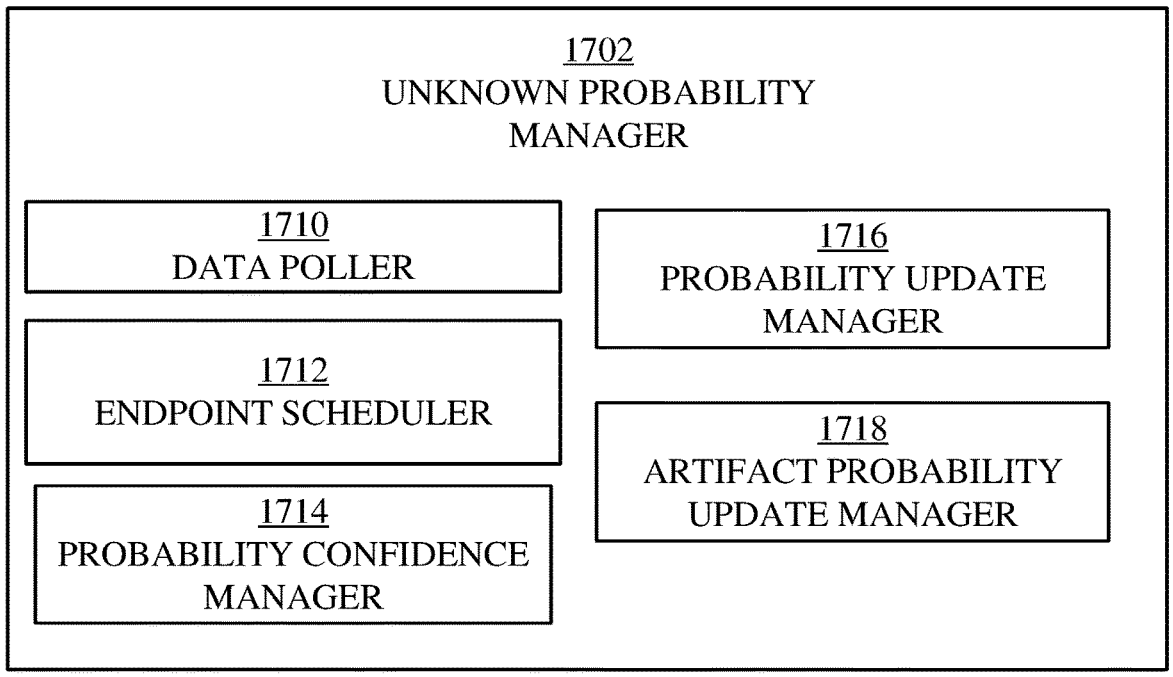
FIG. 17 is a block diagram of a system for updating unknown probabilities, in accordance with some embodiments of the present disclosure.
Figure 17:
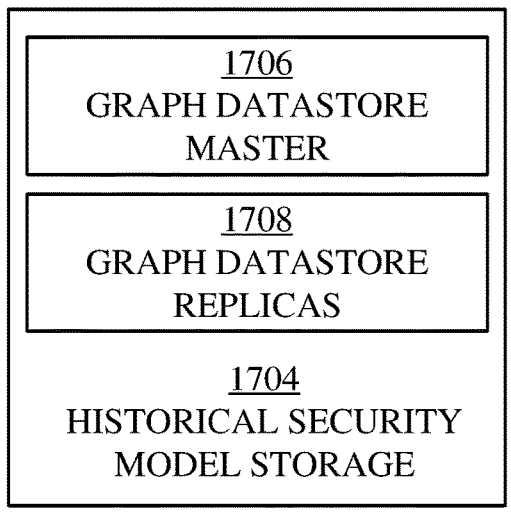

FIG. 17 is a block diagram of a system 1700 for updating unknown probabilities, in accordance with some embodiments of the present disclosure. The system 1700 can include an unknown probability manager 1702 and a historical security model storage 1704. In some scenarios, the influence network 116 can include semantic relationships without a probability (it is either 0 or 1), or a low confidence in the posterior probability (simply due to extreme novelty or a very weak association with other elements). Accordingly, the unknown probability manager 1702 can determine estimations of probabilities of associations between incident artifacts in cases where there is a relatively small amount of relevant data.

The unknown probability manager 1702 includes a data poller 1710, endpoint scheduler 1712, probability confidence manager 1714, probability update manager 1716, and artifact probability update manager 1718. The data poller 1710 and endpoint scheduler 1712 can be similar to the data poller 1408 and endpoint scheduler and API credentials storage 1410 described with respect to FIG. 14.

The probability confidence manager 1714 can examine probabilities mined from the weight probability calculator 722 in FIG. 7 and determine those that have posterior probabilities below a confidence threshold. The probability update manager 1716 can interact with the maximization processor from FIG. 18 to get a new updated probability from the maximization algorithm described in FIG. 18. The artifact probability update manager 1718 can update the artifacts in the Bayesian network with the new probability as well as perform necessary propagations to in-degree edges.

Additionally, the system 1700 can include historical security model storage 1704, which can be a computer storage device that stores versions of the historical security model 118. More specifically, the historical security model storage 1704 can include a historical graph datastore master 1706 and historical graph datastore replicas 1708. The historical graph datastore master 1706 can be a main database writer of the historical security store. Accordingly, the graph datastore replicas 1708 can represent redundant copies of the master to ensure high availability and scalability of service 118.

In some scenarios, the relationships between artifacts can indicate a relatively small probability of occurrence together. In such scenarios, the probability update manager 1716 can use an expectation-maximization algorithm to re-calculate the probability of artifacts occurring together in the same security incident.

Figure 18:
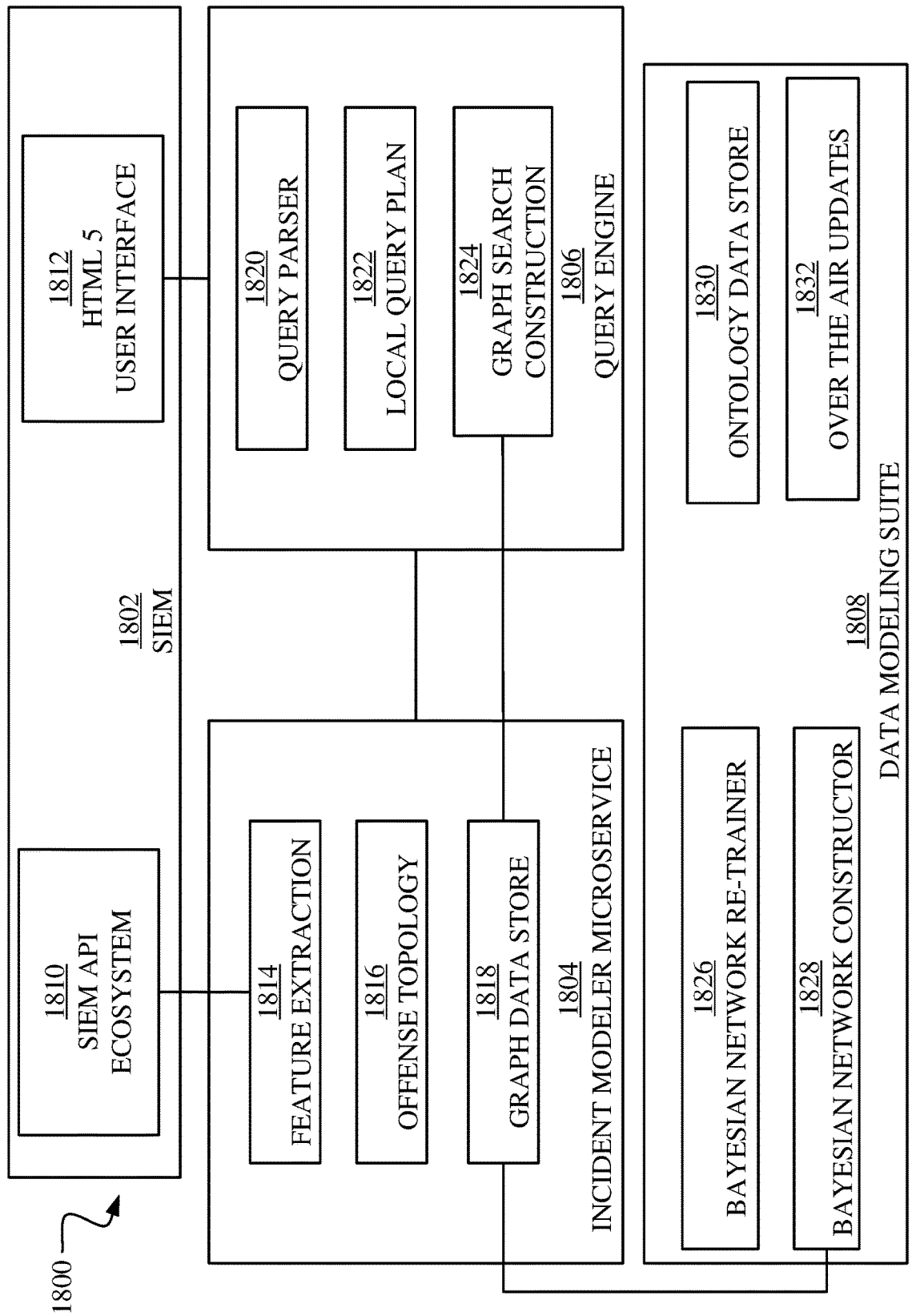
FIG. 18 is a block diagram of an example system for automatically generating historical security models.

FIG. 18 is a block diagram of an example system 1800 for automatically generating historical security models, in accordance with some embodiments of the present disclosure. The system 1800 includes a SIEM 1802, incident modeler microservice 1804, query engine 1806, and a data modeling suite 1808.

The SIEM 1802 can be similar to the data store platform 114 described with respect to FIG. 1. Referring back to FIG. 18, the SIEM 1802 can include a SIEM API ecosystem 1810 and an HTML 5 user interface 1812. The SIEM API ecosystem 1810 can provide a RESTful API that provides access to the data stored in the STEM 1802. The HTML 5 user interface 1812 can provide a user interface wherein it is possible to request access to the STEM data.

The incident modeler microservice 1804 can be similar to the incident modeler 106 described with respect to FIG. 1. In accordance with some embodiments of the present disclosure, the incident modeler microservice 1804 can be provided as a cloud service. The incident modeler microservice 1804 can include feature extraction 1814, offense topology 1816, and a graph data store 1818. The feature extraction 1814 can be responsible for identifying incident artifacts. The offense topology 1816 can be responsible for generating the graphs representing the linkage graph, influence network, and historical security model. The graph data store 1818 can store these graphs.

The query engine 1806 can be similar to the query engine 112 described with respect to FIG. 1. Referring back to FIG. 18, the query engine 1806 can include a query parser 1820, local query plan 1822, and a graph search construction 1824. The query parser 1820 can be responsible for interpreting queries, such as SQL queries, to be executed by the query engine 1806. The local query plan 1822 can represent instructions for the query engine 1806 to perform the work specified in an SQL query. The graph search construction 1824 can determine how to search database tables.

The data modeling suite 1808 can be similar to the data modeling suite 108 described with respect to FIG. 1. Referring back to FIG. 18, the data modeling suite 1808 can represent a computer hardware and/or software architecture that uses an influence network to generate and/or refine a historical security model. In some embodiments, the graph data store 1818 can be a Bayesian network that represents security-implicated relationships between artifacts of the security domain. Additionally, the data modeling suite 1808 can include a Bayesian network re-trainer 1826, Bayesian network constructor 1828, ontology data store 1830, and over the air updates 1832.

The Bayesian network re-trainer 1826 can re-train a historical security model according to the techniques described herein. The Bayesian network constructor 1828 can generate the initial historical security model. The ontology data store 1830 can store a graph representation of the historical security model. Additionally, the over the air updates 1832 can include a set of updates to the historical security model that are provided over an air gap.

Figure 19:
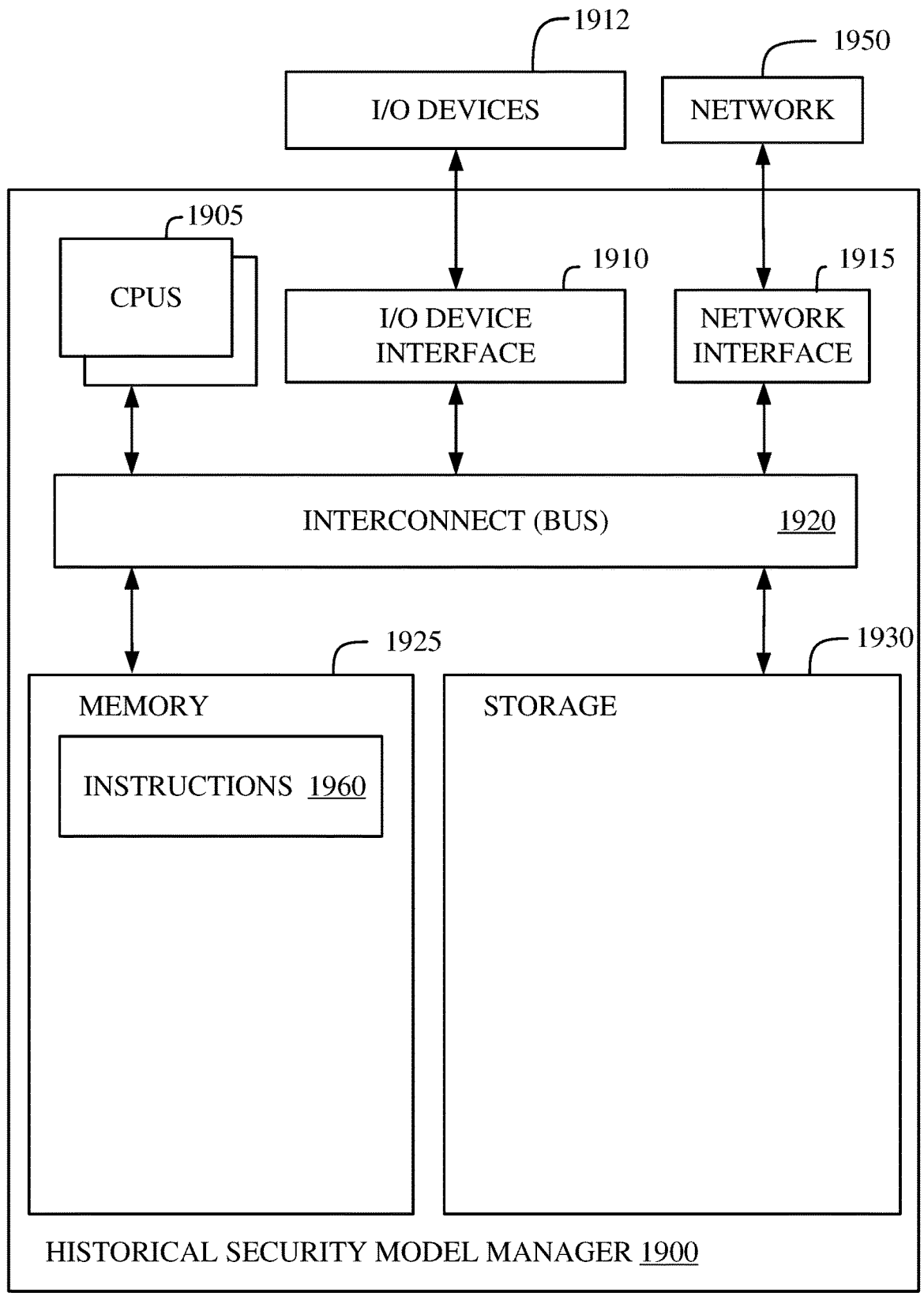
FIG. 19 is a block diagram of an example historical security model manager, in accordance with some embodiments of the present disclosure.

FIG. 19 is a block diagram of an example historical security model manager 1900, in accordance with some embodiments of the present disclosure. In various embodiments, the historical security model manager 1900 is similar to the incident modeler 106 and can perform the methods described in FIGS. 3, 4, 9, 11, 13, and 16, and/or the functionality discussed in FIGS. 1, 2, 5-8, 10, 12, 14, 15, 17, and 18. In some embodiments, the historical security model manager 1900 provides instructions for the aforementioned methods and/or functionalities to a client machine such that the client machine executes the method, or a portion of the method, based on the instructions provided by the historical security model manager 1900. In some embodiments, the historical security model manager 1900 comprises software executing on hardware incorporated into a plurality of devices.

The historical security model manager 1900 includes a memory 1925, storage 1930, an interconnect (e.g., BUS) 1920, one or more CPUs 1905 (also referred to as processors 1905 herein), an I/O device interface 1910, I/O devices 1912, and a network interface 1915.

Each CPU 1905 retrieves and executes programming instructions stored in the memory 1925 or the storage 1930. The interconnect 1920 is used to move data, such as programming instructions, between the CPUs 1905, I/O device interface 1910, storage 1930, network interface 1915, and memory 1925. The interconnect 1920 can be implemented using one or more busses. The CPUs 1905 can be a single CPU, multiple CPUs, or a single CPU having multiple processing cores in various embodiments. In some embodiments, a CPU 1905 can be a digital signal processor (DSP). In some embodiments, CPU 1905 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 1925 is generally included to be representative of a random access memory (e.g., static random access memory (SRAM), dynamic random access memory (DRAM), or Flash). The storage 1930 is generally included to be representative of a non-volatile memory, such as a hard disk drive, solid state device (SSD), removable memory cards, optical storage, and/or flash memory devices. Additionally, the storage 1930 can include storage area-network (SAN) devices, the cloud, or other devices connected to the historical security model manager 1900 via the I/O device interface 1910 or to a network 1950 via the network interface 1915.

In some embodiments, the memory 1925 stores instructions 1960. However, in various embodiments, the instructions 1960 are stored partially in memory 1925 and partially in storage 1930, or they are stored entirely in memory 1925 or entirely in storage 1930, or they are accessed over a network 1950 via the network interface 1915.

Instructions 1960 can be processor-executable instructions for performing any portion of, or all, any of the methods described in FIGS. 3, 4, 9, 11, 13, and 16, and/or the functionality discussed in FIGS. 1, 2, 5-8, 10, 12, 14, 15, 17, and 18.

In various embodiments, the I/O devices 1912 include an interface capable of presenting information and receiving input. For example, I/O devices 1912 can present information to a listener interacting with historical security model manager 1900 and receive input from the listener.

The historical security model manager 1900 is connected to the network 1950 via the network interface 1915. Network 1950 can comprise a physical, wireless, cellular, or different network.

In some embodiments, the historical security model manager 1900 can be a multi-user mainframe computer system, a single-user system, or a server computer or similar device that has little or no direct user interface but receives requests from other computer systems (clients). Further, in some embodiments, the historical security model manager 1900 can be implemented as a desktop computer, portable computer, laptop or notebook computer, tablet computer, pocket computer, telephone, smart phone, network switches or routers, or any other appropriate type of electronic device.

It is noted that FIG. 19 is intended to depict the representative major components of an exemplary historical security model manager 1900. In some embodiments, however, individual components can have greater or lesser complexity than as represented in FIG. 19, components other than or in addition to those shown in FIG. 19 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 20:
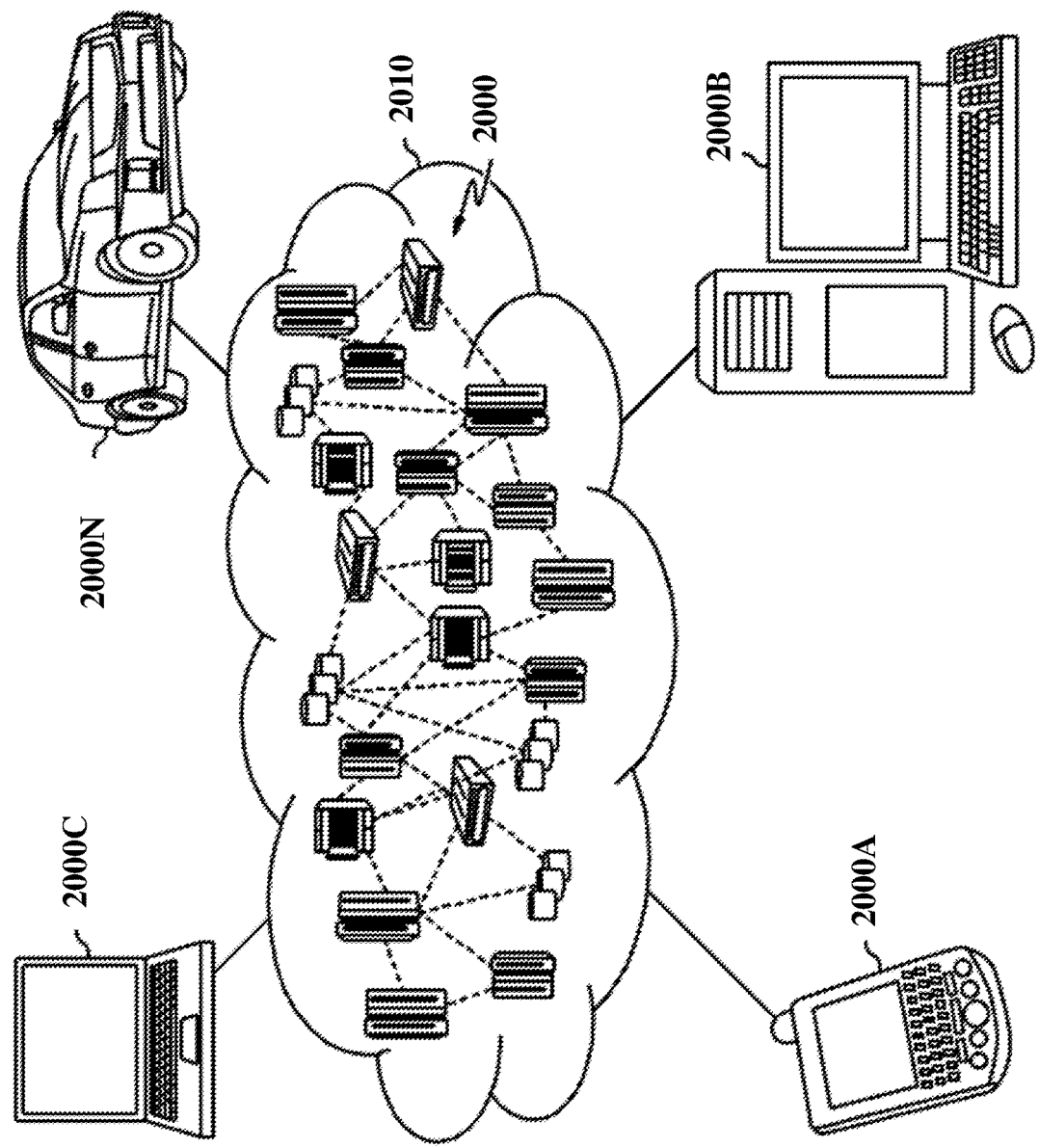
FIG. 20 is a cloud computing environment, according to some embodiments of the present disclosure.

FIG. 20 is a cloud computing environment 2010, according to some embodiments of the present disclosure. As shown, cloud computing environment 2010 includes one or more cloud computing nodes 2000. The cloud computing nodes 2000 can perform the methods described in FIGS. 3, 4, 9, 11, 13, and 16, and/or the functionality discussed in FIGS. 1, 2, 5-8, 10, 12, 14, 15, 17, and 18. Additionally, cloud computing nodes 2000 can communicate with local computing devices used by cloud consumers, such as, for example, personal digital assistant (PDA) or cellular telephone 2000A, desktop computer 2000B, laptop computer 2000C, and/or automobile computer system 2000N. Further, the cloud computing nodes 2000 can communicate with one another. The cloud computing nodes 2000 can also be grouped (not shown) physically or virtually, in one or more networks, such as Private, Community, Public, or Hybrid clouds as described hereinabove, or a combination thereof. This allows cloud computing environment 2010 to offer infrastructure, platforms and/or software as services for which a cloud consumer does not need to maintain resources on a local computing device. It is understood that the types of computing devices 2000A-N shown in FIG. 20 are intended to be illustrative only and that computing nodes 2000 and cloud computing environment 2010 can communicate with any type of computerized device over any type of network and/or network addressable connection (e.g., using a web browser).

Figure 21:
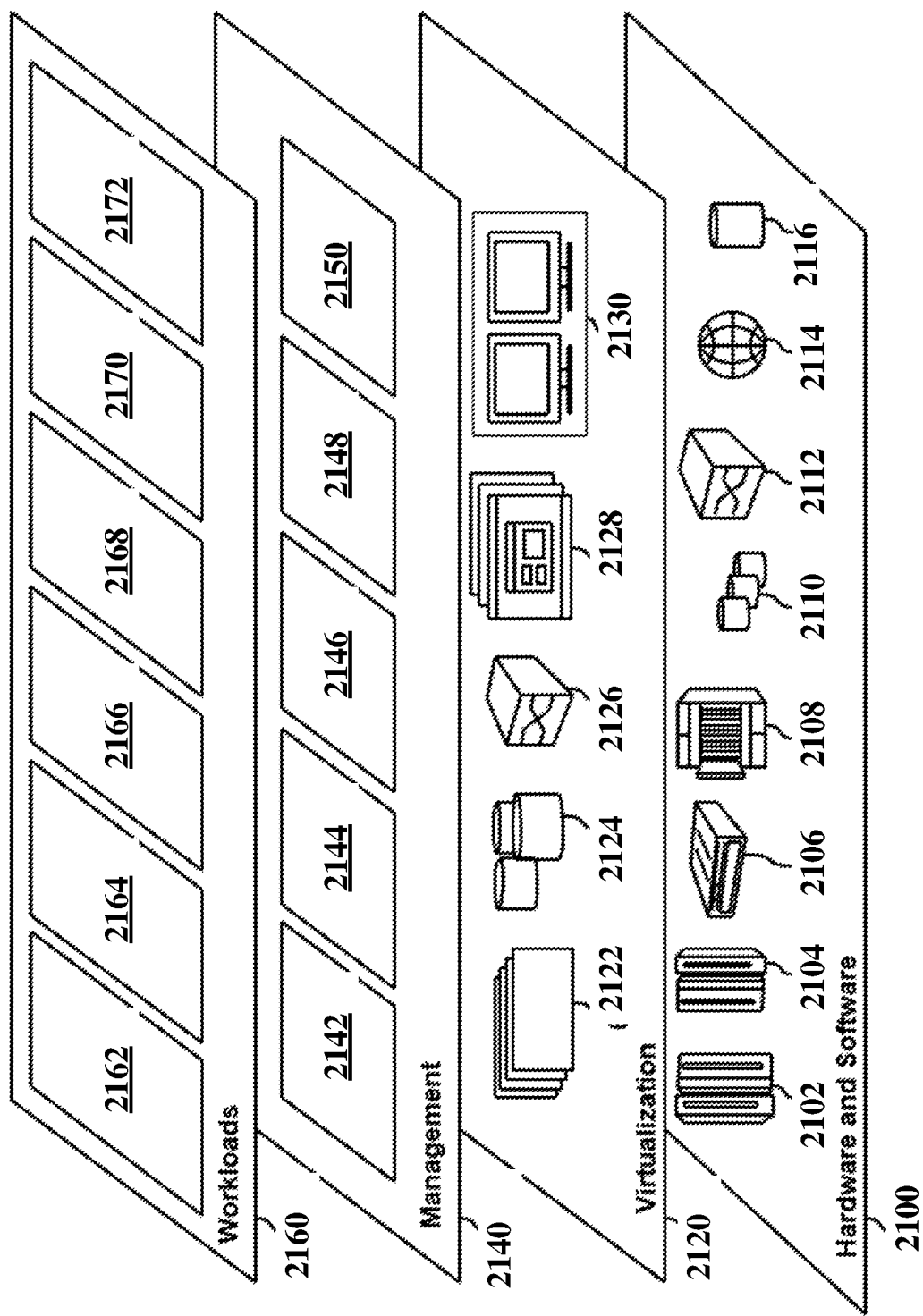
FIG. 21 is a set of functional abstraction model layers provided by cloud computing environment, according to some embodiments of the present disclosure.

FIG. 21 is a set of functional abstraction model layers provided by cloud computing environment 2010 (FIG. 20), according to some embodiments of the present disclosure. It should be understood in advance that the components, layers, and functions shown in FIG. 21 are intended to be illustrative only and embodiments of the disclosure are not limited thereto. As depicted below, the following layers and corresponding functions are provided.

Hardware and software layer 2100 includes hardware and software components. Examples of hardware components include: mainframes 2102; RISC (Reduced Instruction Set Computer) architecture based servers 2104; servers 2106; blade servers 2108; storage devices 2110; and networks and networking components 2112. In some embodiments, software components include network application server software 2114 and database software 2116.

Virtualization layer 2120 provides an abstraction layer from which the following examples of virtual entities can be provided: virtual servers 2122; virtual storage 2124; virtual networks 2126, including virtual private networks; virtual applications and operating systems 2128; and virtual clients 2130.

In one example, management layer 2140 can provide the functions described below. Resource provisioning 2142 provides dynamic procurement of computing resources and other resources that are utilized to perform tasks within the cloud computing environment. Metering and Pricing 2144 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 2146 provides access to the cloud computing environment for consumers and system administrators. Service level management 2148 provides cloud computing resource allocation and management such that required service levels are met. Service level management 2148 can allocate suitable processing power and memory to process static sensor data. Service Level Agreement (SLA) planning and fulfillment 2150 provide pre-arrangement for, and procurement of, cloud computing resources for which a future requirement is anticipated in accordance with an SLA.

Workloads layer 2160 provides examples of functionality for which the cloud computing environment can be utilized. Examples of workloads and functions which can be provided from this layer include: mapping and navigation 2162; software development and lifecycle management 2164; virtual classroom education delivery 2166; data analytics processing 2168; transaction processing 2170; and historical security model manager 2172.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for a security model, comprising:

identifying a plurality of primary semantic relationships between a plurality of initial incident artifacts for a security domain based on a plurality of historical incidents;

identifying a plurality of parsed incident artifacts from a security encyclopedia based on the initial incident artifacts;

determining a plurality of secondary semantic relationships between the parsed incident artifacts based on a natural language processing of the security encyclopedia;

determining a plurality of influence directions corresponding to the secondary semantic relationships based on the secondary semantic relationships and the historical incidents; and generating an influence network based on the initial incident artifacts, the primary semantic relationships, the historical incidents, the parsed incident artifacts, and the secondary semantic relationships.

2. The method of claim 1, further comprising generating a historical security model based on the influence network and the influence directions.

3. The method of claim 2, wherein the historical security model comprises a Bayesian network.

4. The method of claim 2, further comprising querying the historical security model to determine an inference about the security domain and a potential security incident.

5. The method of claim 2, further comprising querying the historical security model to determine an inference about the security domain and a zero-day attack.

6. The method of claim 2, wherein generating the historical security model comprises determining a plurality of probability tables corresponding to the secondary semantic relationships based on the historical incidents.

7. The method of claim 6, wherein the probability tables represent a probability that a first incident artifact influences a second incident artifact when associated by one of the secondary semantic relationships in association with a future security incident.

8. The method of claim 1, further comprising updating the influence network based on an automatic parsing of the security encyclopedia.

9. A computer program product comprising program instructions stored on a computer readable storage medium, the program instructions executable by a processor to cause the processor to perform a method comprising:

identifying a plurality of primary semantic relationships between a plurality of initial incident artifacts for a security domain based on a plurality of historical incidents;

identifying a plurality of parsed incident artifacts from a security encyclopedia based on the initial incident artifacts;

determining a plurality of secondary semantic relationships between the parsed incident artifacts based on a natural language processing of the security encyclopedia;

determining a plurality of influence directions corresponding to the secondary semantic relationships based on the secondary semantic relationships and the historical incidents; and generating an influence network based on the initial incident artifacts, the primary semantic relationships, the historical incidents, the parsed incident artifacts, and the secondary semantic relationships by determining a plurality of probability tables corresponding to the secondary semantic relationships based on the historical incidents.

10. The computer program product of claim 9, the method further comprising generating a historical security model based on the influence network and the influence directions.

11. The computer program product of claim 10, wherein the historical security model comprises a Bayesian network.

12. The computer program product of claim 10, the method further comprising querying the historical security model to determine an inference about the security domain and a potential security incident.

13. The computer program product of claim 10, the method further comprising querying the historical security model to determine an inference about the security domain and a zero-day attack.

14. The computer program product of claim 9, the method further comprising updating the influence network based on an automatic parsing of the security encyclopedia.

15. The computer program product of claim 9, wherein the probability tables represent a probability that a first incident artifact influences a second incident artifact when associated by one of the secondary semantic relationships in association with a future security incident.

16. A system comprising:
a computer processing circuit; and
a computer-readable storage medium storing instructions, which, when executed by the computer processing circuit, are configured to cause the computer processing circuit to perform a method comprising:

identifying a plurality of primary semantic relationships between a plurality of initial incident artifacts for a security domain based on a plurality of historical incidents;

identifying a plurality of parsed incident artifacts from a security encyclopedia based on the initial incident artifacts;

determining a plurality of secondary semantic relationships between the parsed incident artifacts based on a natural language processing of the security encyclopedia;

determining a plurality of influence directions corresponding to the secondary semantic relationships based on the secondary semantic relationships and the historical incidents;

generating an influence network based on the initial incident artifacts, the primary semantic relationships, the historical incidents, the parsed incident artifacts, and the secondary semantic relationships; and generating a historical security model based on the influence network and the influence directions.

17. The system of claim 16, wherein the historical security model comprises a Bayesian network.

18. The system of claim 16, the method further comprising querying the historical security model to determine an inference about the security domain and a potential security incident.

19. The system of claim 16, the method further comprising querying the historical security model to determine an inference about the security domain and a zero-day attack.

20. The system of claim 16, the method further comprising updating the influence network based on an automatic parsing of the security encyclopedia.

* * * * *